Dec. 15, 1959 C. A. NERACHER ET AL 2,916,942
OVERDRIVE TRANSMISSION
Original Filed Nov. 13, 1939 4 Sheets-Sheet 1
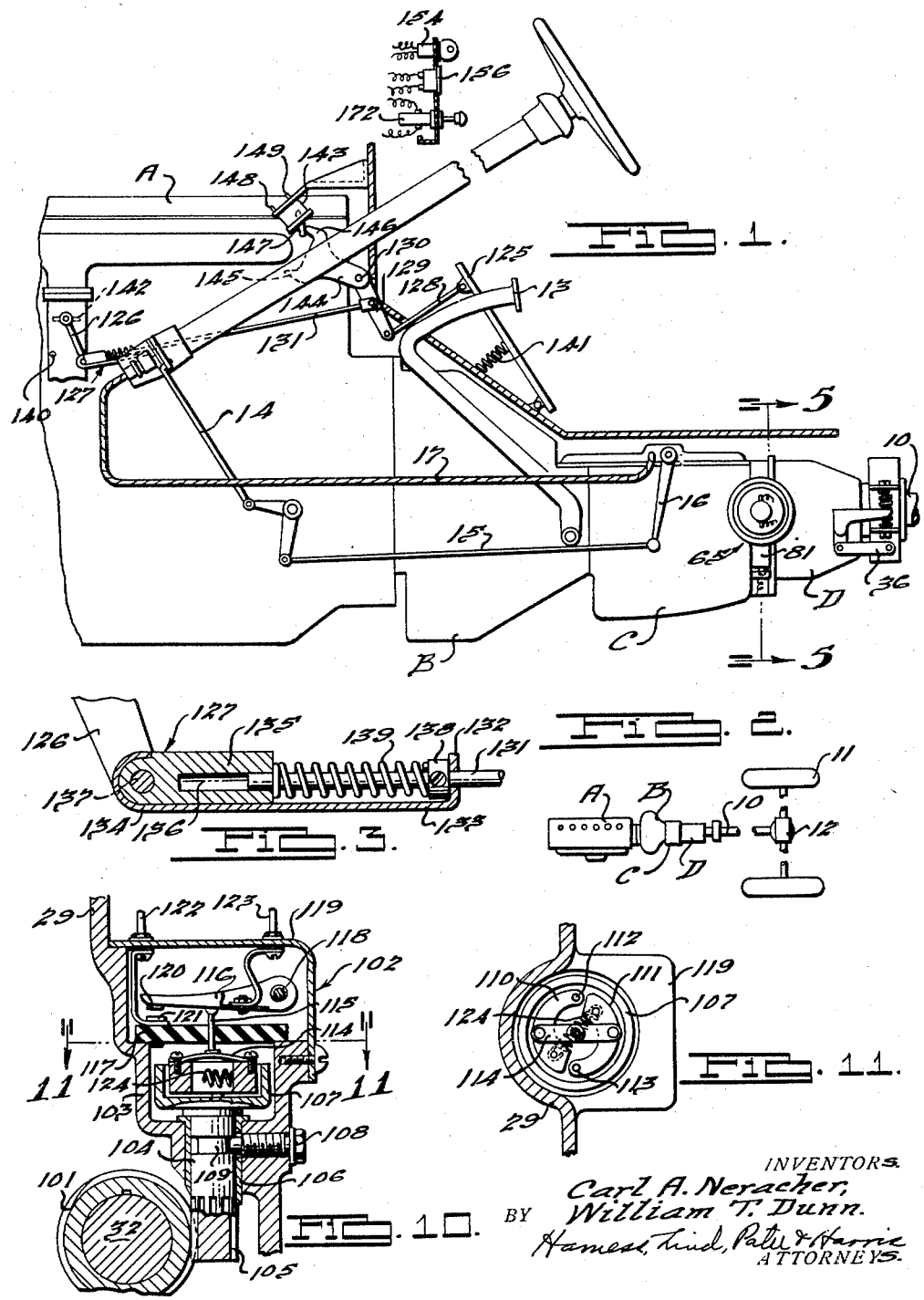
INVENTORS.
Carl A. Neracher,
William T. Dunn.
BY Hamess, Lind, Patu & Harris
ATTORNEYS.

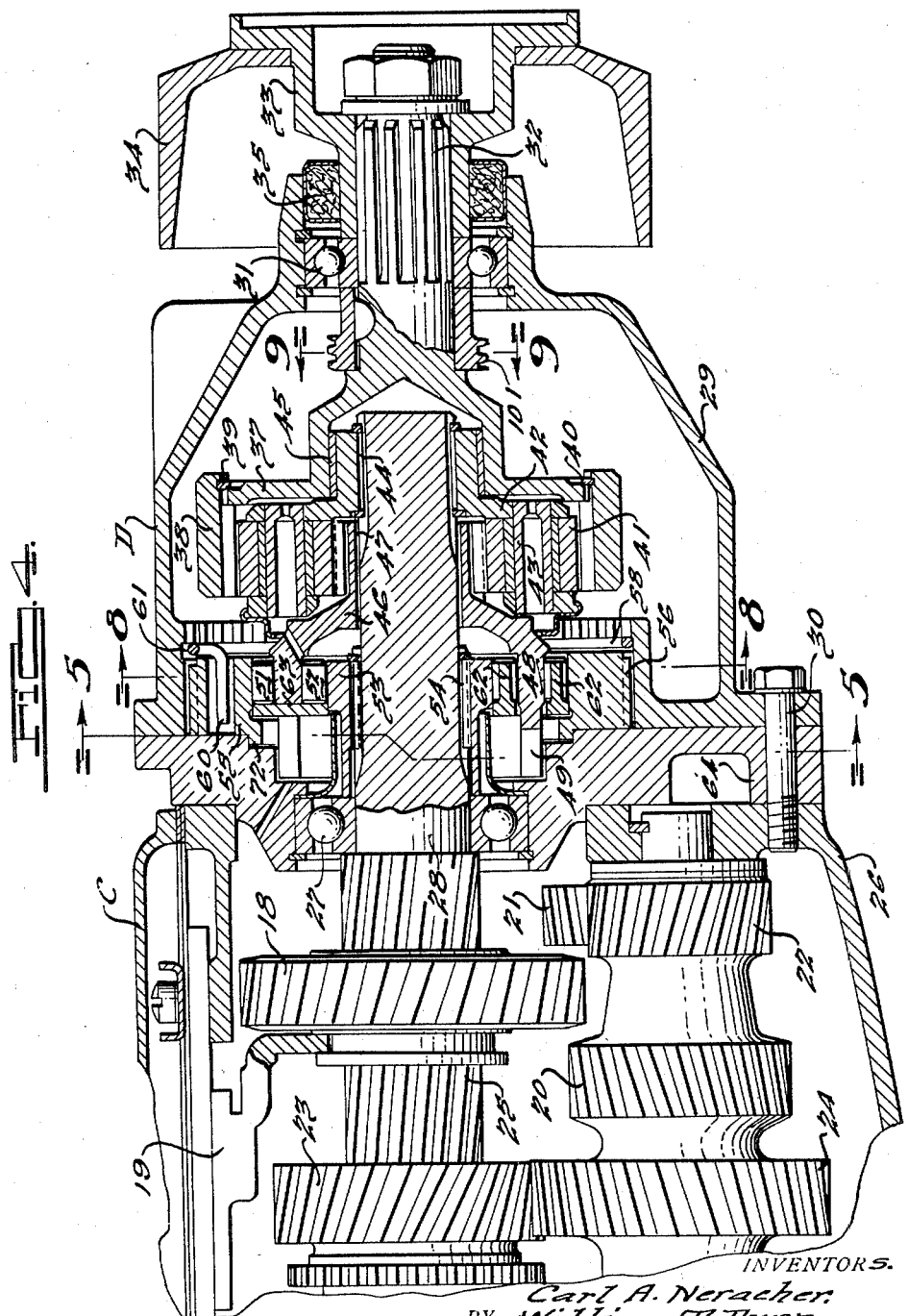

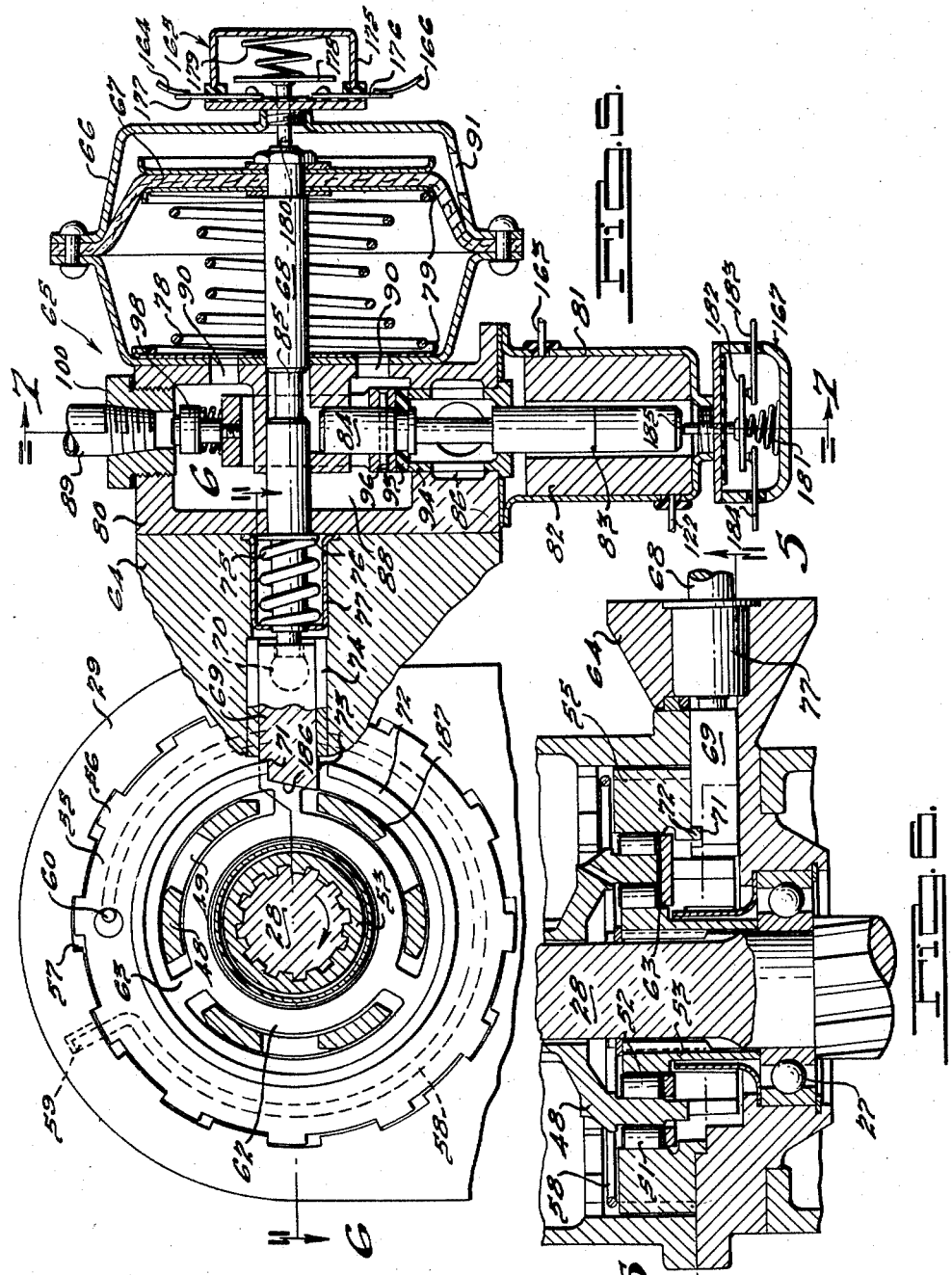

Dec. 15, 1959   C. A. NERACHER ET AL   2,916,942
OVERDRIVE TRANSMISSION
Original Filed Nov. 13, 1939   4 Sheets-Sheet 4
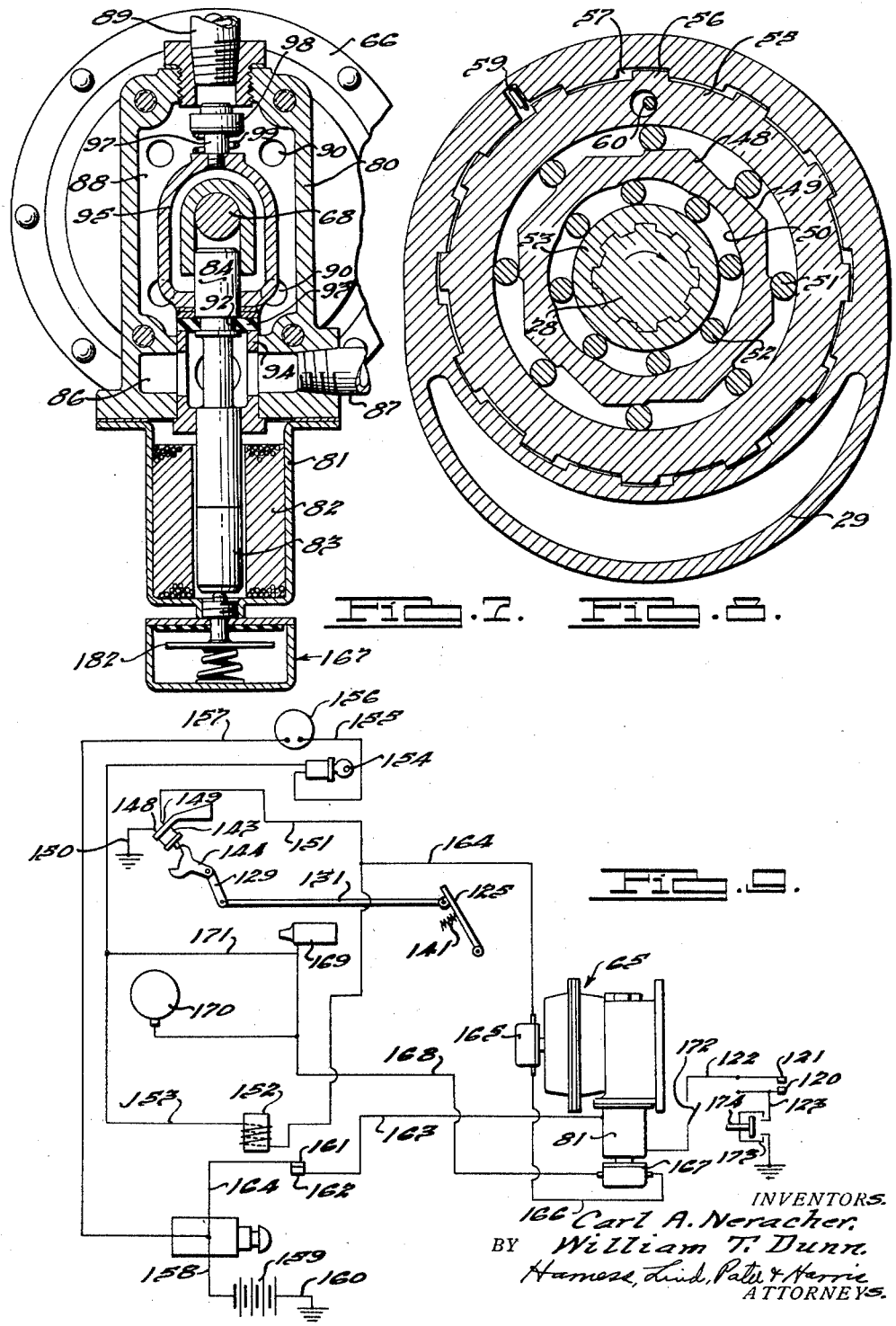
INVENTORS.
Carl A. Neracher,
BY William T. Dunn.
Harness, Dickey, Pierce & Harris
ATTORNEYS.

United States Patent Office 2,916,942
Patented Dec. 15, 1959

2,916,942

OVERDRIVE TRANSMISSION

Carl A. Neracher and William T. Dunn, Detroit, Mich., assignors to Chrysler Corporation, Highland Park, Mich., a corporation of Delaware Original application November 13, 1939, Serial No. 304,060, now Patent No. 2,453,156, dated November 9, 1948. Divided and this application March 6, 1942, Serial No. 433,544

77 Claims. (Cl. 74—472)

This application is a division of our copending application, Serial No. 304,060, filed on November 13, 1939, now Patent No. 2,453,156, dated November 9, 1948.

This invention relates to power transmission and refers more particularly to improvements in speed ratio changing mechanism especially adapted for use in driving motor vehicles.

The principal object of the invention is to provide an improved speed ratio changing mechanism for driving the propeller shaft of a motor vehicle at a speed different from, and preferably faster than, the driving shaft thereof.

Additional objects of our invention are to provide a mechanism of the aforesaid character having improved characteristics of long life, quietness of operation, automatic response to vehicle travel, and low manufacturing cost.

More specifically, another object of the invention is to provide an overdrive transmission mechanism which incorporates an overrunning clutch action between the driving and driven shafts during normal driving for synchronizing the two shafts preparatory to establishing of the faster drive, but which does not permit continuous overrunning during normal drive as is the case with conventional devices of this type, and which requires no lockout means for reverse drive.

Another object is to provide an improved overdrive mechanism wherein the planet pinions do not rotate during direct driving and the annulus gear is driven at direct drive speed rather than at overdrive speed. Such an arrangement results in much quieter operation due to elimination of "gear sing" in direct drive, and promotes economy by cutting down oil churn in the overdrive casing.

Still another object is to provide an improved means for clutching the reaction element of the overdrive planetary gear train to the casing whereby the same clutching means may be used for initially establishing the overdrive, for quickly dis-establishing the overdrive by "kickdown" action of the accelerator pedal or other control means and for re-establishing the overdrive after kickdown.

A further object is to provide an improved means for controlling the operation of the overdrive unit wherein engine vacuum may be used under the control of a solenoid which also acts to lock the clutching means in overdrive position, thus avoiding the possibility of unintentional disengagement of the clutch due to a low vacuum condition in the engine intake manifold. In connection with this improved control means we have provided a system of switches for locking the overdrive out of operation completely at the will of the driver, and for preventing operation of the overdrive when driving in low or intermediate gear of the regular transmission.

A still further feature resides in the novel and improved control means for the overdrive wherein the pawl for clutching the planetary reaction element to the casing for establishment of the fast drive is urged to its engaged position by vacuum and to its disengaged or kickdown position by a spring; the engagement and disengagement of said pawl being controlled by a solenoid which also acts to lock the pawl in its engaged position upon establishment of the fast drive.

A still further feature is the provision of a novel system of switches for grounding of the engine ignition for kickdown, the said switches being so arranged that ignition grounding may occur by reason of accelerator pedal overtravel only when the overdrive mechanism is in operation.

An additional and extremely important feature of our invention resides in the provision of a double overrunning clutch device which eliminates free-wheeling of the vehicle in all speeds in addition to eliminating the necessity for locking out the overdrive mechanism during reverse driving as is the case with overdrives of the prior art. In connection with the double overrunning device, we have provided improved blocker mechanism which positively prevents engagement of the planetary reaction element locking pawl except during coast of the vehicle, the blocking element being moved out of blocking position by action of the planetary unit itself during coast of the vehicle.

Additional objects and advantages of our invention will be more apparent from the following detailed description of a preferred embodiment thereof, reference being had to the accompanying drawings in which:

Fig. 1 is a partial side elevational view of a motor vehicle equipped with the improved overdrive mechanism showing the essential control apparatus.

Fig. 2 is a diagrammatic representation of the vehicle drive mechanism.

Fig. 3 is an enlarged sectional view of the lost motion connection between the throttle valve control lever and the accelerator pedal linkage.

Fig. 4 is a sectional view in side elevation of the improved overdrive mechanism, part of the regular vehicle transmission also being shown.

Fig. 5 is a sectional view taken approximately along the line 5—5 of Figs. 4 and 6.

Fig. 6 is a sectional view taken on the line 6—6 of Fig. 5.

Fig. 7 is a sectional view taken along the line 7—7 of Fig. 5.

Fig. 8 is a sectional view taken along the line 8—8 of Fig. 4.

Fig. 9 is a circuit diagram of the electrical connections.

Fig. 10 is a sectional view of the governor mechanism for controlling the cut-in of the overdrive mechanism.

Fig. 11 is a sectional view along the line 11—11 of Fig. 10.

Referring to the drawings in which like reference numerals designate corresponding parts in the following description, we have illustrated (Fig. 2) our overdriving mechanism D interposed between a speed ratio transmission C of the manually controlled type and a driven shaft 10, the latter extending rearwardly to drive the rear wheels 11 through the usual differential mechanism 12. The transmission C is connected to the engine A through the usual clutch B operated by a pedal 13, and is adapted for selective control by the driver by means of the links 14, 15, the lever 16 and the Bowden cable 17, the links and cable being actuated by a control lever (not shown) mounted at the top of the steering column.

The transmission C may be of general conventional construction and operation thus we have shown only a part of it in Fig. 4 wherein 18 designates a low speed and reverse gear adapted to be shifted by the usual selector control member forwardly (to the left as viewed in Fig. 4) into mesh with the low speed countershaft gear 20, or rearwardly into mesh with the reverse idler gear 21. The latter is in constant mesh with the countershaft gear 22. The intermediate speed gear 23 journaled on the mainshaft 25 is in constant mesh with the countershaft gear 24 and may be clutched to the shaft 25 for driving the same at an intermediate speed by means not shown, it being understood that by proper manipulation of the transmission controls, the mechanism may be adapted to selectively produce reverse drive and different speed ratio drives forwardly.

In Fig. 4, the shaft 25 is supported at the rear end of the transmission casing 26 by an anti-friction ball bearing 27 and has a reduced rearwardly extending portion 28 with which the overdrive mechanism is operatively associated. The overdrive is housed in a casing 29 secured to the casing 26 by fasteners 30 and carries an anti-friction bearing 31 at the rear end thereof in which is supported a tailshaft 32. The latter has a hub member 33 splined thereto which carries the drum 34 of a transmission shaft brake referred to generally by the numeral 36 in Fig. 1. A fiber seal 35 forms a grease retainer for the end of the housing.

The tailshaft 32 has an enlarged bell-shaped forward portion 37 which carries the annulus gear 38 of the planetary gearset, the driving connection therebetween being provided by the teeth 39. A snap ring 40 retains gear 38 in correct position. In mesh with the annulus gear 38 is a plurality of planet gears 41 rotatably mounted on a carrier 42 by means of axles 43. The carrier is splined at 44 on the end of the shaft portion 28 and is separated from the part 37 by a suitable bushing 45.

The planet gears 41 also mesh with a sun gear 46 journaled on the shaft 28 at 47 just forwardly of the carrier 42. The sun gear has a forwardly extending control sleeve 48 provided with a plurality of slots 49, the purpose of which will be presently made clear. The sleeve 48 is provided with an external cam 49 and an internal cam 50 which respectively form drive elements of outer and inner overrunning devices having sets of rollers designated 51 and 52 respectively. The other drive element of the inner overrunning device consists of a cylindrical member 53 splined on the shaft 28 at 54. The other drive element of the outer overrunning device consists of a member 55 provided with a cylindrical inner surface and a toothed outer surface; the teeth 56 of which are adapted to be received into slots 57 milled into the inner surface of the casing 29. It will be noted (Figs. 5 and 8) that the slots 57 are longer than the teeth 56 the clearance thereby provided permitting the member 55 a slight degree of rotational movement about the axis of the assembly. A spring 58 disposed in a slot 61 cut in the casing 29 and fixed against movement relative to the casing and to the member 55 at 59 and 60 respectively acts to urge the member 55 to the limit of its rotational movement in the direction of forward rotation of the shaft 28, as shown in Fig. 8.

The overrunning rollers 51 and 52 are carried by a common cage or carrier 62 having spokes 63 (see Fig. 5) which extend through the slots 49, three of said slots being cut deeper, as shown in Fig. 4, to accommodate the same.

The cage 62 maintains the rollers 51, 52 in a definite relation with respect to each other and with respect to the cams 49 and 50. From Fig. 8 it may be seen that the rollers 51 are advanced circumferentially in the direction of rotation of the shaft 28 relatively to the rollers 52 and the cams 49 and 50 are so related to the rollers that the rollers 51 are in their neutral position when the rollers 52 are locked in driving position. Conversely, movement of the cage 63 to lock the rollers 51 in driving position will move the rollers 52 into their neutral non-driving position.

From the description so far, it may be seen that forward (clockwise) rotation of the shaft 28 will also rotate the planet carrier 42, the annulus 38 being held stationary due to the resistance of the rear drive wheels 11 to which the annulus is directly connected. This will cause the sun gear 46 to be driven forwardly at a greater speed than that of shaft 28, which in turn will cause the sun gear control sleeve 48 to drivingly engage the member 53 through lock-up of the rollers 52 between the cam 50 and the outer cylindrical surface of the member 53. The entire planetary gear set will then rotate as a unit and drive the tailshaft 32 at the speed of the shaft 28, the sleeve 48 rotating freely relatively to the reaction member 55 through overrun of the rollers 51. Under such conditions the positions of the various parts are as shown in Fig. 8 and the vehicle is driving in "direct" or conventional gear. If the driver removes his foot from the accelerator pedal permitting the vehicle to coast, the annulus 38 will become the driving element of the planetary set and the direction of rotation of the planet gears 41 will be reversed thus causing the sun gear 46 to rotate backwardly (counterclockwise) and disengage from driving relationship with the member 53 thereby unlocking rollers 52 which may then roll freely and locking the rollers 51 between the cam 49 and the member 55. The latter then becomes the reaction taking element for the planetary set and the shaft 28 is driven forwardly at a reduced speed relatively to shaft 32. It is therefore apparent that free-wheeling cannot occur when the car is in conventional gear.

When the transmission C is set for reverse drive, shaft 28 rotates backwardly (counterclockwise) and the resistance on the annulus 38 at the start causes the sun gear 46 to be rotated rearwardly thereby locking to the member 55. The annulus 38 will then be driven backwardly driving the tailshaft 32 backwardly at a speed greater than that of the shaft 28. In other words, the drive in reverse is an overdrive, the effective ratio of which may be adjusted as desired by suitably proportioning the gears 21 and 22.

Upon deceleration in reverse, the annulus 38 will reverse the rotation of the planet pinions 41 and cause the sun gear 46 to unlock from the member 55 and lock up to the member 53 thereby driving the shaft 28 at the speed of the tailshaft 32.

During the above described operations, the reaction taking element 55 will rotate backwardly against the spring 58 whenever lock-up occurs between the members 48 and 55 thereby cushioning the shock occasioned by the reversal of the sun gear.

It is to be noted that the aforesaid arrangement provides a decided advantage when rocking the vehicle between forward and reverse, as is frequently done when the car is mired, because a short period of free-wheeling occurs during reversal of the sun gear and a fast shift may be obtained without use of the clutch pedal.

Means will now be described for holding the sun gear 46 against rotation during forward driving of the vehicle to furnish reaction for the planetary gear set to provide a forward overdriving ratio and for controlling the holding means to provide desirable and convenient control thereof.

Referring now to Figs. 5, 6 and 7, in conjunction with Figs. 1 and 4, it may be seen that the end wall 64 which separates the casing 26 from the casing 29 has mounted on the left side thereof a prime mover unit referred to generally as 65. This prime mover unit comprises a vacuum cylinder 66 having a diaphragm 67 therein operatively associated with a rod 68 which extends transversely inwardly of the wall 64 and which has a pawl 69 secured to the end thereof by means of a ball connection 70.

The pawl 69 is provided with a notch 71 which is adapted to engage the forwardly extending ledge 72 of the reaction taking member 55 when the latter is in its forward position, this being the position shown in Figs. 5, 6 and 8 and the one to which the member 55 is urged by the spring 58. The member 55 thus acts as a blocker member for preventing engagement of the pawl 69 during the time that the sun gear 46 is locked to the shaft 28 by the rollers 52. The ledge 72 is provided with a milled slot 73 which, upon rotation of the member 55 rearwardly to take up the clearance between the slots 57 and the teeth 56, will permit the pawl to pass through and engage in the slots 49 of the sun gear control sleeve 48. Before this action can take place, however, the outer overrunning rollers 51 cooperate with the sun control sleeve to effect a simultaneous unblocking of the pawl and a synchronization of the sun control sleeve with the pawl to thereby permit a smooth and easy engagement. This action will be presently more clearly described in detail.

A pair of guide plates 74 flank the pawl 69 where it slides in the part 64 and the rod 68 is preferably provided with a coil spring 75 which is adapted to be compressed between the abutment 76 and the bottom of the cup 77 upon movement of the rod to engage the pawl. The vacuum actuated diaphragm 67 is also provided with a coil spring 78, suitably retained in place by cups 79, which tends to urge the diaphragm 67 and the rod 68 outwardly. The spring 78 is also adapted to be compressed when vacuum is admitted to the cylinder 66 to move the rod 68 inwardly.

Between the cylinder 66 and the part 64 a valve housing 80 is provided which has an electrical solenoid 81 attached to the bottom side thereof. The solenoid is provided with the usual coil 82 and plunger 83, the latter having an upwardly extending portion 84 which is adapted upon energization of the solenoid to engage the reduced portion 85 of the rod 68 to thereby lock the latter against unintentional outward movement under the influence of springs 75 and 78 due to a low vacuum condition which might exist in the cylinder 66 because of high torque demand or the like.

The valve housing 80 is provided with a chamber 86 which is supplied with vacuum through a pipe 87 connected to any suitable source such as the intake manifold of the vehicle engine. The main valve chamber 88 is open to the atmosphere through a pipe 89 during the time the solenoid is de-energized and the vehicle is driving in conventional gear.

The vacuum cylinder 66 is in communication with the main valve chamber 88 at all times through the openings 90 (of which four are provided) on one side of the piston diaphragm 67, the chamber on the other side of the diaphragm being open to the atmosphere at 91.

The solenoid plunger rod portion 84 has a reduced portion at 92 to which is secured a fiber valve member 93, the latter being adapted to seat on top of the annulus member 94 when the solenoid is de-energized thereby cutting off the vacuum or low pressure chamber 86 from communication with the main chamber 88 and the motor 66. The rod 84 is further provided with a stirrup-like member 95 fastened thereto by a pin 96. This member 95 carries an upright pin 97 on which is disposed a valve member 98 of fiber or the like which is urged upwardly by a coil spring 99.

The valve member 98 is adapted to cut off the entrance of atmospheric air into the valve chamber 88 upon energization of the solenoid 81 which action, of course, causes the plunger 83 to move upwardly lifting the valve 93 off its seat and admitting vacuum into the chamber 88 whereupon the air present in cylinder 66 on the left side of the diaphragm 67 is exhausted and the atmospheric pressure on the other side of the diaphragm causes the diaphragm to move inwardly toward the left to engage the pawl 69 in one of the slots 49 provided that the pawl is unblocked. The extreme upper end of the rod portion 84 engages the rod 68 just forwardly of the reduced portion 85 upon upward movement of the solenoid plunger. Inward movement of the rod 68 to engage the pawl will bring the reduced portion 85 adjacent the end of rod portion 84 whereupon the plunger 83 will move upwardly an additional amount to engage the rod portion 84 in the notch 85, thus locking the rod 68 against movement in the outward direction under the influence of the coil springs 75 and 78, which action might occur under conditions of low vacuum, such as when the vehicle is ascending a hill at low speed. The valve member 98 seats against the opening in the plug 100 and cuts off the atmosphere during the first part of the movement of plunger 83, the second part of said movement being accommodated by yielding of the spring 99.

Novel means is provided for controlling the energization of the solenoid 81 to cause the pawl 69 to be engaged under the proper conditions of vehicle operation and for returning the drive to conventional gear by disengagement of the pawl under all conditions of vehicle operation as desired by the driver.

In Fig. 4 a worm 101 is shown keyed to the tailshaft 32. This worm drives the vehicle speedometer (not shown) and in addition drives a governor mechanism for controlling the speed at which the solenoid 81 is energized for engaging the overdrive mechanism. The governor, referred to in Fig. 10 by the numeral 102, is mounted on the far side of the transmission casing 29 by means of a boss 103 and includes a shaft 104 having a worm gear 105 formed thereon for engagement with the worm 101. The shaft turns in a bushing 106 and has an enlarged cup-shaped upper portion 107. A setscrew 108 engages a groove 109 cut in the shaft for retaining the same in correct position. A pair of centrifugally actuated weights 110, 111 are pivoted in the cup 107 at 112, 113 respectively and are normally urged toward one another by a coil spring 124, an upwardly bowed flexible element 114 being attached to each of said weights as shown in Figs. 10 and 11. The element 114 has an upwardly extending post 115 attached thereto which extends upwardly through an insulating strip 117 into contact with a switch arm 116. The latter is pivoted at 118 to a cover 119 and has a contact 120 at one end which is adapted to engage a second contact 121 carried by the insulating strip 117 upon rotation of the shaft 104 at a speed sufficient to cause the weights 110, 111 to move outwardly away from each other appreciably. The contact 121 is connected to one side of the solenoid 81 (Fig. 9) by a wire 122 and the switch arm 116 is connected by a wire 123 to ground.

The spring 124 may be of any desired strength to give the cut-in characteristics desired for the overdrive. It has been found preferable to provide a spring of such strength that the contact 120 will engage the contact 121 to close the solenoid circuit at a vehicle speed of approximately 20 miles per hour at which time the driver may effect a shift to overdrive ratio by momentarily releasing the accelerator pedal which will reverse the torque through the transmission and unblock the pawl 69 as will be more clearly explained later on herein.

Once the pawl 69 has been engaged by action of the vacuum motor 66, it will remain engaged so long as the solenoid 81 is energized, which, as aforesaid, occurs at approximately 20 miles per hour. We have, however, provided means under the direct control of the driver for de-energizing the solenoid and effecting a quick shift back to direct drive at speeds greater than 20 miles per hour. This means is entirely separate from the governor mechanism and is controlled by overtravel of the regular vehicle accelerator pedal. The mechanism for securing this function is preferably arranged so that the accelerator pedal may be depressed to overtravel the engine throttle when fully open to thereby effect a de-energization of the solenoid and a momentary interruption of the engine torque to permit withdrawal of the pawl 69 from engagement with the sun gear 46. This arrangement is termed a "kickdown" control, and is preferably associated with the accelerator pedal since the driver ordinarily has his foot on this pedal and naturally depresses the pedal when increased power or speed is desired. The kickdown control is preferably used to secure increased torque when a quick increase in vehicle speed is desired such as when passing another car on a hill.

Referring to Figs. 1 and 9, it may be seen that the accelerator pedal 125 is connected to the throttle control member 126 by a lost motion mechanism generally referred to at 127 and which is shown in detail in Fig. 3. The accelerator pedal 125 is operatively connected by means of a link 128 with a lever 129 pivoted on the vehicle at 130. The lever 129 is in turn connected through the throttle valve control lever 126 by means of a rod 131 which is adapted to slide through an opening in the ear 132 of a bracket 133, this bracket having a forward portion 134 secured to a guide block 135 provided with a rearwardly open bore 136 and having pivotal connection at 137 with the throttle valve control lever 126. Rod 131 has fixed thereto a collar 138 forwardly adjacent the ear 132, a preloaded spring 139 surrounding the rod and acting between the block 135 and the collar 138 so that normally this spring serves as a connection between the rod 131 and block 135. The spring 139 functions as an overtravel spring and permits rod 131, lever 129 and pedal 125 to have a certain amount of overtravel after the throttle valve control lever 126 has engaged the stop 140 provided on the carburetor device as shown in Fig. 1. During overtravel of the accelerator pedal 125, spring 139 advises the driver that he is manipulating the accelerator pedal for actuation of the kickdown mechanism by reason of the extra resistance in addition to the regular accelerator pedal return spring 141 afforded by this compression of spring 139 which occurs when the collar 138 moves toward the block 135. In other words, when the accelerator pedal is manipulated for kickdown, extra resistance is encountered by reason of compressing spring 139 during operation of the Fig. 3 mechanism which accommodates overtravel of the accelerator pedal beyond its wide open throttle position. The forward end of rod 131 is slidably disposed in the bore 136, the bracket 134 limiting the operating tendency of the rod 131 and block 135 under the action of spring 139.

When the accelerator pedal 125 is depressed to open the throttle valve which is indicated at 142 in Fig. 1, link 128 operates to swing the lever 129 forwardly about the pivot 130, rod 131 thrusting block 135 forwardly with the relative movement therebetween so as to swing lever 126 forwardly and, as the accelerator pedal is depressed to the end of its range of throttle opening movement, the lever 126 will engage the stop 140. The accelerator pedal 125 is then adapted to have a further range of movement which overtravels the throttle valve, while maintaining the latter in its wide open throttle position, and in order to accommodate this over-travelling movement, the mechanism illustrated in Fig. 3 comes into action so that during said overtravel of rod 131, said rod will slide into the bore 136 and compress spring 139 with the forwardly moving block 135 or the throttle operating lever 126. Upon release of the accelerator pedal 125, spring 139, assisted by spring 141, operates to restore the parts to their normal closed position illustrated in Fig. 1. During this return movement of the parts, rod 131 and its associated parts, including accelerator pedal 125, move relative to block 135 and lever 126 until the collar 138 engages the ear 132 of the bracket 134 and thereafter spring 141 will move rod 131 along with block 135 and lever 126 without lost motion until the throttle valve 142 is restored to closed position and the accelerator pedal 125 is correspondingly positioned as in Fig. 1.

The aforesaid overtravelling movement of accelerator pedal 125 is adapted to effect energization of the solenoid 81 through operation of a switch 143. A switch operating lever 144 is fixed to the aforesaid lever 129 and is adapted to move therewith, this lever 144 having a pair of switch operating fingers 145 and 146 alternately engageable with the swinging operating element 147 of switch 143 which is preferably of the well-known snap-over type and provided with terminals 148 and 149. Terminal 148 is connected by a wire 150 which is grounded on the vehicle frame (Fig. 9) and terminal 149 is connected by a wire 151 to one side of a relay 152, the latter being in turn connected by a wire 153 to one side of the vehicle ignition switch 154.

In the fully released (throttle closed) position of the accelerator pedal 125 as is shown in Fig. 1, the finger 146 has operated the switch element 147 so that the switch is open and when the accelerator pedal 125 is depressed to the limit of its aforesaid throttle opening movement, the finger 145 has been swung upwardly about the lever support 130 and into engagement with the forward face of switch element 147. When the accelerator pedal is depressed for the aforesaid overtravelling range of movement, the finger 145 then swings the switch element 147 in a counterclockwise direction to cause this element to have the well-known snap-over action in closing the switch 143. When the accelerator pedal is again partially released to its wide open throttle position, finger 146 does not immediately engage switch element 147 for restoring the switch to its open position, this finger 146 preferably engaging the switch element when the pedal nears the end of its movement to fully released position such that the last portion of the releasing movement of the pedal is utilized for causing finger 146 to effect the snap-over switch opening movement of the element 147 in restoring the parts to their Fig. 1 position.

Thus it may be seen that the switch 143 when closed will effect energization of relay 152, one side of said relay being connected to ground through wire 151 and switch 143, and the other side of said relay being connected through wire 153, ignition switch 154, wire 155, vehicle ammeter 156, wire 157 and wire 158 to one side of the vehicle battery 159 which is in turn grounded through wire 160. The contacts 161, 162 of the relay 152 are normally closed thus connecting one side of the solenoid 81 to the battery 159 through the wires 163 and 164. It may thus be seen that closing of the switch 143 will open the contacts 161, 162 thus de-energizing the solenoid 81. In addition, the switch 143 will effect a momentary grounding of the vehicle ignition for securing the torque reversal necessary to unload the pawl 69 to thereby permit the springs 75 and 78 to pull the pawl out of engagement with the sun gear control sleeve 48. It may be seen from Fig. 9 that the wire 164 connects one side of the switch 143 with a switch 165 which is connected in series through wire 166 with a second switch 167, the latter switch being connected through a wire 168 with the ignition coil 169 and the distributor 170. A jumper wire 171 connects the coil 169 and distributor 170 with the wire 153 which is connected through the ignition switch and ammeter to one side of the vehicle battery 159.

The diagram of Fig. 9 also shows a switch 172 which is adapted to be mounted on the instrument panel of the vehicle as indicated in Fig. 1 for manual operation by the driver. The switch 172 is ordinarily closed but may be opened by the driver to cut out the overdrive mechanism if desired. An additional switch 173 is indicated in Fig. 9 which is adapted for operation by the high gear shift rail (not shown) of the manually shiftable transmission mechanism C. The switch 173 comprises a housing containing a pair of contacts which are adapted to be connected by the member 174 which is in turn adapted to be engaged by the shift rail upon shifting of the vehicle transmission C into high or direct drive. The switch 173 may be omitted from this circuit without in any way effecting the operation of the overdrive mechanism, the use of such switch being optional in cases where it is desired to prevent shift of the transmission into overdrive ratio until after the vehicle has been shifted into direct drive ratio in the manually shiftable transmission mechanism C.

Referring to Fig. 5 it may be seen that the switch 165 includes a housing 175 which encases a pair of contacts 176, 177 which are connected to the wires 166, 164, respectively, and a plunger 178 urged by a spring 179 into contact with the contacts 176, 177. The plunger 178 is provided with an actuating pin 180 which is adapted to be engaged by the outer end of the rod 68 when the parts are in the position shown in Fig. 5, thus maintaining the switch 165 in open position to break the circuit between the wires 164 and 166.

The switch 167 is generally similar in construction to switch 165 except that the spring 181 thereof urges the plunger member 182 out of contact with the contacts 183, 184, the said plunger having an actuating pin 185 which is adapted to be engaged by the lower end of the solenoid plunger 83 to close the switch 167 when the parts are in their Fig. 5 position.

It may thus be seen that when the vehicle is being driven in direct or conventional gear, the switch 165 is open and the switch 167 is closed. Under such conditions, if the accelerator pedal 125 should be fully depressed to the limit of its overtravel position, grounding of the ignition could not take place due to the interruption in the ignition grounding circuit at the switch 165. Upon shifting of the mechanism into overdrive speed ratio, upward movement of the solenoid plunger 83 opens the switch 167 and the subsequent inward movement of the pawl actuating rod 68 permits the switch 165 to close. Under these conditions, upon depression of the accelerator pedal to the limit of its overtravel position which will of course effect closing of the switch 143 and deenergization of the solenoid 81 under operation of the relay 152, return of the solenoid plunger 83 to the Fig. 5 position will close switch 167. Switch 165 being also closed, this will effect the grounding of the ignition through wires 150, switch 143, wires 151, 164, switch 165, wire 166, switch 167 and wire 168. At the instant the ignition is grounded, a reversal of torque through the transmission will occur which will unload the pawl 69 permitting the springs 75 and 78 to thrust the diaphragm 67 and rod 68 outwardly disengaging the pawl from the slot 49. The rod 68 will thus engage the actuating member 180 of switch 165 and open the switch thereby interrupting the ignition grounding circuit and restoring the ignition.

The kickdown operation just described takes place in an instant and the momentary interruption of the ignition circuit is barely noticeable to the occupants of the vehicle. As soon as the ignition circuit is restored by the opening of the switch 165, the motor drives under wide open throttle conditions in direct drive until the accelerator pedal is partially or fully released. It is not necessary for the driver to hold the accelerator pedal 125 fully depressed to the full extent of its overtravel in order to maintain the vehicle in kickdown because the solenoid 81 will remain deenergized until the pedal 125 has substantially returned to its idle position under the influence of the spring 141. This is necessary because of the construction of the switch control lever 144 which is explained above, it being necessary that the accelerator pedal 125 be substantially returned to its idle position before the finger 145 will contact the element 147 of the snap-over switch 143.

In the operation of the overdrive mechanism as a whole, let it be assumed that the switch 173 is included in the overdrive control circuit and that the vehicle is at rest with the engine running. The manually operable change speed mechanism C may be manipulated and the vehicle accelerated through the gears therein until direct drive through the transmission mechanism C has been obtained. During this period a speed greater than that necessary to effect closing of the governor switch contacts 120 and 121 may be obtained but energization of the solenoid 81 will not occur until direct drive has been obtained whereupon the switch 173 will be closed by engagement of the high gear rail of the transmission C with the element 174 of the switch. After a speed not in excess of approximately 20 miles per hour has been reached in high or direct drive, the contacts 120 and 121 of the governor controlled switch will close thus effecting energization of the solenoid 81 which will cause the plunger 83 thereof to thrust upwardly until the upper end portion 84 engages the rod 68 just inwardly of the depressed portion 85 thereof. A spring 181 will open the switch 167 at this time. The upward movement of the solenoid plunger 83 will unseat the valve element 93 thereby admitting vacuum from the intake manifold of the vehicle engine which is present in chamber 86 into the main valve chamber 88. At the same time the valve element 98 will be seated against the opening in the part 100 to cut off the admission of atmosphere into the valve chamber 188. The air front of the diaphragm 67 of the motor 66 will thus be exhausted and the diaphragm will tend to move inwardly toward the shaft 28 but is prevented from doing so by the engagement of the blocker ledge 72 with the notch 71 of the pawl 69.

The driver may then secure a shift into overdrive ratio by momentarily releasing the accelerator pedal 125 which will cause the sun gear 26 to disengage from the rollers 52 and rotate rearwardly into driving engagement with the rollers 51 to thereby pick up the element 55 and rotate it rearwardly against the spring 58 to take up the clearance between the teeth 56 and slots 57. This backward movement of element 55 will unblock the pawl 69 thereby permitting the pawl to be thrust inwardly by the diaphragm 67 and rod 68 into engagement with one of the slots 49. It should be noted that at this particular instant the sun gear control sleeve 48 is stationary because of the reverse rotation of the planet gears 41 thereby permitting the pawl 69 to engage the slots 49 smoothly and siliently. If it should happen that the sleeve 48 is in such position that the pawl 69 cannot engage one of the slots thereof, the engagement will occur instantly while depressing the accelerator pedal to continue driving of the vehicle. As may be seen from Fig. 5 the pawl 69 is inclined on its forward face at 186 and the sleeve 48 is chamfered at 187 adjacent each of the slots 49 to facilitate engagement of the pawl 69 should said pawl fail to engage while the sun gear is stationary.

Inward movement of the diaphragm 67 and rod 68 will of course permit the spring 179 to close the switch 165. The driver may then depress the accelerator pedal and the car will be driven forwardly in overdrive ratio.

The car will continue to be driven in overdrive ratio so long as the accelerator pedal 125 is not depressed to the limit of its overtravelling range of movement and the speed of the governor mechanism 102 which in the particular embodiment being described is preferably set at approximately 20 miles per hour. If the speed of the vehicle is allowed to fall substantially below 20 miles per hour, the weights 110 and 111 of the governor mechanism will be moved toward each other by the spring 124 thereby lifting the movable switch element 116 and operating the contacts 120 and 121. The solenoid 81 will thus be deenergized and the plunger thereof will return to the Fig. 5 position to thereby unlock the rod 68, unseat the valve member 98, seat the valve member 93 and close the switch 167. Air from the atmosphere will then enter valve chamber 88 through pipe 89 and flow into cylinder 66 through the openings 90. The springs 75 and 78 will then tend to move the diaphragm 67, rod 68 and pawl 69 toward the right of Fig. 5 which action will take place as soon as the frictional load upon the pawl occasioned by the pressure of the sides of the slots 49 is sufficiently low to permit the springs 75 and 78 to pull the pawl out of engagement with the slots 49. The outward movement of the rod 68 will of course open the switch 165 as aforesaid. In order to effect shift back into overdrive, the car must be accelerated to a speed greater than 20 miles per hour and the accelerator pedal released momentarily to permit the pawl to be reengaged as above described.

It is desired to point out that while vacuum means has been described as the preferred prime mover means for operating the overdrive pawl 69, other means may be employed such as a hydraulic cylinder or an electrical solenoid. Various parts of the mechanism shown and described herein may be changed or omitted without materially altering the operation of the device. For example, the solenoid locking function of the plunger rod portion 84 is not absolutely necessary for the successful operation of the overdrive nor is it absolutely necessary to have the switches 172 and 173 in the control circuit. Other changes and modifications will readily be apparent to those skilled in the art and we do not wish to limit our invention in its broader aspects to any of the parts, combinations and arrangements such as are shown and described for illustrative purposes, the scope of the invention being defined in the claims appended hereto.

We claim:

1. In a power transmission for driving a motor vehicle having an internal combustion engine; a driving shaft adapted to receive drive from the engine and a driven shaft adapted to be driven from said driving shaft; means including planetary gearing operable between said shafts for driving the driven shaft from the driving shaft at an overspeed relatively thereto; said gearing including a rotatable control gear adapted to be held from rotation to provide said overspeed drive and to be released for rotation to release said overspeed drive, holding means including a pawl selectively engageable with said control gear to hold the same against rotation or to release the same for rotation, pawl operating means adapted to effect said operation of said pawl with respect to said control gear, control means including a solenoid adapted to so control said pawl operating means as to thereby effect engagement of said pawl with said control gear; and vehicle-speed responsive means for controlling energization of said solenoid whereby a step-up in the vehicle driving ratio may be effected upon attainment of a predetermined speed.

2. In a power transmission for driving a motor vehicle having an internal combustion engine and a driver manipulated throttle control; a driving shaft adapted to receive drive from the engine and a driven shaft adapted to drive from said driving shaft; planetary gearing operable between said shafts for driving the driven shaft from the driving shaft at an overspeed relatively thereto; said gearing including a rotatable control gear adapted to be held from rotation to provide said overspeed drive and to be released for rotation to release said overspeed drive; holding means selectively operable to hold said control gear against rotation or to release said control gear for rotation, means for effecting said selective operation of said holding means with respect to said control gear, control means including a solenoid adapted upon energization to so control said operating means for said holding means as to thereby effect said holding operation of said holding means and upon de-energization to effect said releasing operation to release said holding means; means operable in response to vehicle speed for controlling energization of said solenoid; and means operable in response to manipulation of said throttle control for controlling energization of said solenoid.

3. In a power transmission for driving a motor vehicle having an internal combustion engine; a driving shaft adapted to receive drive from the engine and a driven shaft adapted to drive the vehicle; relatively slow speed driving means for driving the driven shaft from the driving shaft; relatively fast speed driving means for driving the driven shaft from the driving shaft at a speed faster than that provided by said slow speed driving means, including a control gear operably associated therewith and adapted when held against rotation to establish said relatively fast speed drive; a pawl adapted for engagement with said control gear to hold the same against rotation; solenoid controlled motor means selectively operable to engage said pawl; a spring operably associated with said pawl for constantly urging said pawl toward its disengaged position; and governor means driven by the vehicle for controlling operation of said motor means, said governor means being adapted to energize said solenoid and thus effect operation of said motor means to engage said pawl when said vehicle has attained a predetermined speed.

4. In a power transmission for driving a motor vehicle having an internal combustion engine and a driver operable engine throttle control; a driving shaft adapted to receive drive from the engine and a driven shaft adapted to drive the vehicle; relatively slow speed driving means for driving the driven shaft from the driving shaft; relatively fast speed driving means for driving the driven shaft from the driving shaft at a speed faster than that provided by said slow speed driving means, including a control gear operably associated therewith and adapted when held against rotation to establish said relatively fast speed drive; a pawl adapted for engagement with said control gear to hold the same against rotation; solenoid controlled motor means selectively operable to engage said pawl; a spring operably associated with said pawl for constantly urging said pawl toward its disengaged position; governor means driven by the vehicle for controlling operation of said motor means, said governor means being adapted to energize said solenoid and thus effect operation of said motor means to engage said pawl when said vehicle has attained a predetermined speed; and means operating in response to driver operation of said throttle control for deenergizing said solenoid and for effecting momentary interruption of the power delivery of said engine thereby causing said motor means to operate to step-down the drive through the transmission by effecting release of said pawl and operation of said relatively slow speed driving means.

5. In a power transmission for driving a motor vehicle having an internal combustion engine and a driver manipulated throttle control; a driving shaft adapted to receive drive from the engine and a driven shaft adapted to be driven from said driving shaft, means including planetary gearing operable between said shafts for driving the driven shaft from the driving shaft at the speed of the driving shaft or at an overspeed relatively thereto; said gearing including a rotatable control gear adapted to be held from rotation to provide said drive and to be released for rotation to release said drive; holding means selectively operable to hold said control gear against rotation or to release said control gear for rotation, comprising a pawl adapted for engagement with said control gear and a motor for actuating said pawl; means for selectively controlling operation of said holding means with respect to said control gear, said means including an electromagnet for controlling operation of said motor, vehicle-speed-responsive means for effecting energization of said electromagnet, and means operable in response to manipulation of said throttle control for controlling energization of said electromagnet independently of said speed responsive means when said vehicle is traveling above a predetermined speed.

6. In a power transmission for driving a motor vehicle having an internal combustion engine and a driver operable engine throttle control; a driving shaft adapted to receive drive from the engine and a driven shaft adapted to drive the vehicle; relatively slow speed driving means for driving the driven shaft from the driving shaft; relatively fast speed driving means for driving the driven shaft from the driving shaft at a speed faster than that provided by said slow speed driving means, including positively engageable drive control elements operably associated therewith and adapted when engaged to establish said relatively fast speed drive, one of said drive control elements being movable relative to the other to establish and release said relatively fast speed drive, said elements when engaged being subjected to thrust transmission therebetween during said relatively fast speed drive so as to resist disengagement of said elements to release this drive until the power delivery of the engine is momentarily interrupted; said relatively slow speed driving means including a control device operating automatically to establish this drive in response to release of said relatively fast speed driving means; electromagnet controlled motor means operative upon energization of said electromagnet to move said relatively movable drive control element for controlling operation of said relatively fast speed driving means; means yieldingly opposing movement of said relatively movable drive control element by said motor means; and means operating in response to driver operation of said throttle control for deenergizing said electromagnet for rendering said motor means inoperative and for effecting momentary interruption of the power delivery of said engine thereby causing said yielding means to operate to step-down the drive through the transmission by effecting release of said relatively fast speed driving means and operation of said relatively slow speed driving means.

7. In a power transmission for driving a vehicle having an engine; change speed means including a shiftable member operable to effect change in the transmission speed ratio; fluid pressure actuated means for controlling operation of said change speed means; electromagnetically operated means for controlling operation of said fluid pressure means; speed controlled means for effecting energization and deenergization of said electromagnetically operated means; and means operable by the vehicle driver for effecting energization and deenergization of said electromagnetically operated means, said electromagnetically operated means being adapted when energized to hold said shiftable member against shifting movement.

8. In a power transmission for driving a vehicle having an engine; means operable to effect change in the transmission speed ratio; electromagnet operated means for controlling operation of said change speed means; governor means; means for operating said governor means at a speed proportionate to the vehicle speed; a switch operated by said governor means; electrical circuit-forming means controlled by said switch for energizing said electromagnet; a second switch; means operable by the vehicle driver for operating said second switch; and electrical means controlled by said second switch for deenergizing said electromagnet.

9. In a power transmission for driving a vehicle having an engine; means including motor means operable to effect change in the transmission speed ratio; electromagnet operated means for controlling operation of said motor means; speed controlled means for effecting energization and deenergization of said motor means; a control element operable by the vehicle driver; and means operable in response to operation of said control element for simultaneously effecting momentary interruption of the normal power delivery of the engine and energization of said electromagnet.

10. In a drive for a motor vehicle having a power driving shaft and a shaft adapted to be driven therefrom to drive said vehicle, means including planetary gearing for driving said driven shaft from said driving shaft at the same speed thereof or at a different speed relative thereto; said planetary gearing having one of the elements thereof drivingly connected to said driving shaft and another of the elements thereof drivingly connected to said driven shaft; and overrunning means disposed between said driving shaft and the third element of said planetary gearing, said overrunning means being adapted to drivingly connect said third element to said driving shaft upon rotation of said shaft by said vehicle motor; and means operable upon coast of said vehicle for holding said third element against rotation in the direction of rotational tendency thereof caused by drive of said driven shaft connected member.

11. In a drive for a motor vehicle having a power driving shaft and a shaft adapted to be driven therefrom to drive said vehicle, means including planetary gearing for driving said driven shaft from said driving shaft at the same speed thereof or at a different speed relative thereto: said planetary gearing including an annulus gear drivingly connected to the driven shaft, a carrier drivingly connected to the driving shaft, and a sun gear journalled on said driving shaft; overrunning means disposed between said sun gear and said driving shaft operable to clutch said gear to said shaft upon forward rotation of said shaft by the vehicle motor; and a second overrunning means disposed between said sun gear and a fixed part of said vehicle operable to hold said gear against rotation upon forward coast of said vehicle.

12. In a drive for a motor vehicle having an engine, a driving shaft driven by said engine; a driven shaft adapted to drive the vehicle; means for driving said driven shaft from said driving shaft at the same speed thereof or at a different speed relative thereto; said means comprising planetary gearing, said gearing including an element drivingly connected to said driven shaft, an element drivingly connected to said driving shaft and a third element rotatably carried by one of said shafts; overrunning clutch means operatively associated with said third planetary element and operable upon forward rotation of said driving shaft by said engine to clutch said element to one of said shafts thereby to establish a 1 to 1 speed ratio driving connection between said shafts; an overrunning brake device operatively associated with said third planetary element and operable upon overrun of said driven shaft relatively to said driving shaft to hold said third element against rotation in the direction of rotational tendency thereof caused by said overrun thereby to establish a driving connection between said shafts having a speed ratio different from said 1 to 1 ratio.

13. In a motor vehicle power transmission mechanism, a driving shaft driven by the motor of said vehicle; a driven shaft adapted to drive said vehicle; means for driving said driven shaft from said driving shaft at the speed of said driving shaft or at an overspeed relatively thereto; said means including an overrunning clutch device in the driving connection between said shafts, said device being operable to transmit drive while said shafts are driving at the same speed and to release said drive upon tendency of said driven shaft to overrun said driving shaft; and a second overrunning device operable upon release of said drive as aforesaid to establish an underspeed driving connection between said shafts.

14. In a drive for a motor vehicle having an engine, a driving shaft adapted to be driven by the engine in a forward or reverse direction; a driven shaft adapted to drive the vehicle; means for driving said driven shaft from said driving shaft at the same speed thereof or at an overspeed relatively thereto; control means operably associated with said drive means; said control means being automatically operable upon forward rotation of said driving shaft by said engine to establish a 1 to 1 speed ratio drive between said shafts, and upon reverse rotation of said driving shaft by said engine to establish an overspeed drive between said shafts.

15. In a drive for a motor vehicle having an engine, a driving shaft adapted to be driven by the engine in a forward or reverse direction; a driven shaft adapted to drive the vehicle; means for driving said driven shaft from said driving shaft at the same speed thereof or at an overspeed relatively thereto; drive control means operably associated with said drive means; said drive control means including clutch means automatically operable upon forward rotation of said driving shaft by said engine to establish a 1 to 1 speed ratio drive between said shafts, and upon tendency of said driven shaft to overrun said driving shaft in the forward direction to establish an underspeed drive between said shafts.

16. In a drive for a motor vehicle having an engine provided with an electrical ignition circuit; vehicle driver operable control means; transmission mechanism including an element adapted to be held against rotation to provide a drive from the engine to the vehicle; a holding member adapted to be engaged with said element to establish said drive, means operable in response to acceleration of the vehicle to predetermined speed for urging said holding member into engagement with said element; said holding member during engagement thereof being subjected to thrust such that disengagement thereof is resisted; electrically controlled motor operating means adapted to effect disengagement of said holding member thereby to release said drive and including an electromagnet adapted to be controlled by said driver control means; means operable upon control of said electromagnet by operation of said driver control means for interrupting said ignition circuit thereby to relieve the thrust on said holding member; and means operable upon disengagement of said holding member from said element for restoring said ignition circuit.

17. In a drive for a motor vehicle having an engine provided with an electrical ignition circuit; vehicle driver operable control means; transmission mechanism including an element adapted to be held against rotation to provide a drive from the engine to the vehicle; a holding member adapted to be engaged with said element to establish said drive; motor operating means for effecting engagement and disengagement of said holding member; an electromagnet for controlling said motor means; said electromagnet being adapted upon energization thereof to cause said motor means to move said holding member into engagement and upon deenergization thereof to cause said motor means to move said holding member out of engagement, and means for controlling energization of said electromagnet including a governor driven by the vehicle and means operable by said driver operable control means for overruling said governor.

18. In a drive for a motor vehicle having an engine provided with an electrical ignition circuit; vehicle driver operable control means; transmission mechanism including an element adapted to be held against rotation to provide a drive from the engine to the vehicle; a holding member adapted to be engaged with said element to establish said drive, said member during engagement thereof being subjected to thrust such that disengagement thereof is resisted; electrically controlled motor operating means adapted to effect disengagement of said holding member thereby to release said drive including an electromagnet adapted to be controlled by said driver control means; a switch operably associated with said driver operable control means; a second switch operably associated with said electromagnet and adapted to be closed upon deenergization thereof; a third switch operably associated with said motor means and adapted to be closed upon movement thereof to engage said holding member; and circuit forming means connecting said switches in series with said ignition circuit and ground.

19. In a motor vehicle drive having a driving structure adapted to receive drive from the vehicle engine; a driven structure adapted to drive the vehicle; a casing; gear means in said casing operably connecting said structure for driving the driven structure from and at a speed different than that of the driving structure; said gear means including a rotatable drive-reaction-taking element; means for releasably holding said reaction-taking element to effect said different speed drive comprising a shiftable holding member adapted for engagement with said reaction-taking element thereby to hold said reaction-taking element against rotation; control means for said shiftable member operable to block shift of said member into engagement with said element during rotation of said element; said control means comprising a blocker member carried by said casing with clearance to accommodate limited rotation relatively thereto; and an overrunning device operatively disposed between said reaction-taking element and said blocker member for permitting overrun when said different speed drive is not functioning, said device being operable to establish a drive connection between said reaction-taking element and said blocker member upon coast of said driven structure.

20. In a motor vehicle drive having a driving structure adapted to receive drive from the vehicle engine, a driven structure adapted to drive the vehicle; a casing; gear means in said casing operably connecting said structures for driving the driven structure from the driving structure at the same speed or at a different speed relatively to said driving structure; said gear means including a rotatable drive-reaction-taking element; means operable to lock said gear means for rotation as a unit with said driving and driven structures thereby to establish said same speed drive; means for holding said reaction-taking element against rotation to establish said different speed drive; said holding means comprising a shiftable holding member carried by said casing adapted for shift into engagement with said reaction-taking element; control means operable to block shift of said holding member during rotation of said reaction-taking element including a blocker member carried by said casing with clearance to accommodate limited rotation relatively thereto; and means actuated by said driven structure upon vehicle coast in said same speed drive for rotating said blocker member through said clearance to unblock said shiftable member and for stopping rotation of said reaction-taking member thereby to facilitate shift of said shiftable holding member into engagement with said reaction-taking element.

21. In combination, a casing; driving and driven power transmitting structures in said casing; gearing drivingly connecting said structures including a drive-reaction-taking element adapted upon drive of said driving structure to releasably drivingly engage said driving structure thereby to establish a 1 to 1 speed ratio drive between said structures, said element being further adapted upon tendency of said driven structure to overrun said driving structure to disengage from said driving structure and releasably lock against rotation relatively to said casing thereby to establish a different speed ratio drive between said structures; and means adapted for operation upon locking of said element during said overrun for engaging said element and locking the same against rotation when drive of said driving structure is resumed.

22. In combination, a casing; driving and driven power transmitting structures disposed in said casing; planetary gearing drivingly connecting said structures, said gearing including an element drivingly connected to said driven structure, a second element drivingly connected to said driving structure, and a reaction-taking-element, said reaction-taking-element having a control portion; an overrunning device disposed between said control portion and said driving structure and adapted upon drive of said driving structure to releasably clutch said reaction-taking-element to said driving structure; a second overrunning device disposed between said control portion and said casing and adapted upon tendency of said driven structure to overrun said driving structure to lock said reaction-taking element against rotation in the direction of rotational tendency thereof caused by said overrun.

23. In a motor vehicle transmission mechanism having a casing for enclosing said mechanism; driving and driven structures in said casing; gear means for drivingly connecting said structures including an element adapted to be held against rotation for establishing a drive between said structures; a pawl shiftably carried by said casing and adapted to be shifted into engagement with said element; means for shifting said pawl comprising a fluid pressure motor adapted to be energized to shift said pawl into engagement with said element; an electromagnet for controlling said motor, and means actuated by said electromagnet for locking said pawl in engaged position.

24. In a motor vehicle power transmission having an engine; a driving structure adapted to receive drive from the engine, a driven structure adapted to receive drive from the driving structure for driving the vehicle; means operable to establish a speed ratio drive relationship between the driving and driven structures and including positively engageable drive control elements, one of which is movable relatively to the other to establish and release said speed ratio drive; a vacuum motor operable to control drive-establishing and drive-releasing movement of said movable drive control element, said motor comprising a suction chamber and a piston operable therein by suction from a first position to a second position thereof; a spring acting to move said piston to its said first position when said chamber is vented; piston operated means for transmitting movement from said piston to said movable drive control element and adapted for movement from a first position to a second position for imparting drive-releasing movement to said movable drive control element; valving means for controlling suction application to and venting of said chamber; holding means operable from a first position of releasably holding said piston operated means in its said first position to a second position accommodating movement of said piston operated means to its said second position; electro-magnetic means for controlling operation of said valving means and said holding means; and vehicle speed responsive means for controlling operation of said electro-magnetic means.

25. In a drive for a motor vehicle having an engine and a shiftable transmission mechanism operable to provide a plurality of forward speed ratio drives and reverse drive, an additional transmission mechanism operable to provide at least two forward drives of relatively different predetermined fixed speed ratio; a control mechanism operably associated with said additional transmission for controlling step-up in the speed ratio thereof; and means including a switch adapted for operation incidentally to shifting of said shiftable transmission for limiting operation of said control mechanism to vehicle drive in certain of the forward speed ratio drives of said shiftable transmission.

26. In a power transmission for a motor vehicle having a housing, a driving shaft and a shaft driven therefrom, means including a planetary gearset drivingly disposed between said shafts for establishing a plurality of speed ratio drives therebetween, said gearset having a sun gear provided with a drive control sleeve portion; an overrunning roller disposed between the inner surface of said sleeve and said driving shaft operable for establishing a drive connection between said shafts and for releasing said drive connection when the driven shaft overruns the driving shaft; and a second overrunning roller disposed between the outer surface of said sleeve and the housing operable automatically upon the driven shaft overrunning the driving shaft for establishing a driving connection between said shafts.

27. In a power transmission for driving a motor vehicle having an internal combustion engine and a driver operable engine throttle control, a driving shaft adapted to receive drive from the engine and a driven shaft adapted to drive the vehicle; relatively slow speed driving means for driving the driven shaft from the driving shaft; relatively fast speed driving means for driving the driven shaft from the driving shaft at a speed faster than that provided by said slow speed driving means, including a positively engageable drive control element operably associated therewith and adapted when engaged to establish said relatively fast speed drive, said element when engaged being subjected to driving thrust during said relatively fast speed drive so as to resist disengagement of said element to release this drive until the power delivery of the engine is momentarily diminished; said relatively slow speed driving means including a control device operating automatically to establish this drive in response to release of said relatively fast speed driving means; electromagnetically controlled means adapted to effect engagement and disengagement of said element thereby to respectively establish and release said relatively fast speed driving means; means responsive to predetermined speed of travel of the vehicle for energizing said electromagnetically controlled means; and means operating in response to driver operation of said throttle control for deenergizing said electromagnetically controlled means and for momentarily diminishing the power delivery of said engine thereby to step-down the drive through the transmission by effecting release of said relatively fast speed driving means and operation of said relatively slow speed driving means.

28. In a motor vehicle power transmission having an engine, a driving structure adapted to receive drive from the engine; a driven structure adapted to receive drive from the driving structure for driving the vehicle; means operable to establish a speed ratio drive relationship between the driving and driven structures and including positively engageable drive control elements, one of which is movable relatively to the other to establish and release said speed ratio drive; a vacuum motor operable to control drive-establishing and drive-releasing movement of said movable drive control element, said motor comprising a suction chamber and a piston operable therein by suction from a first position to a second position thereof; a spring acting to move said piston to its said first position when said chamber is vented; piston operated means for transmitting movement from said piston to said movable drive control element and adapted for movement from a first position to a second position for imparting drive-releasing movement to said movable drive control element; valving means for controlling suction application to and venting of said chamber; latch means operable to hold said piston operated means in its said first position, said latch means being releasable to accommodate movement of said piston operated means to its second position; electromagnetic means for controlling operation of said valving means and said latch means; vehicle speed responsive means for controlling operation of said electromagnetic means.

29. In a power transmission for driving a vehicle having an engine, a source of electrical power, a throttle and a throttle control; a transmission drive-controlling element operable from a first position to a second position for effecting a change in the transmission drive; a motor operable to control operation of said element from its said first position to its said second position and adapted to be vented and thereby rendered inoperative to accommodate return of said element to its said first position; means urging said return of said element when said motor is vented; electrical means including switch means adapted for operation by said throttle control for effecting venting of said motor, and further switch means operable for connection in series with the aforesaid switch means for causing diminution in the normal power delivery of said engine and operable for restoring said normal power delivery in response to said return of said element.

30. In a power transmission for driving a vehicle having an engine and a source of electrical power; a transmission drive-controlling element operable from a first position to a second position for effecting a change in the transmission drive; a vacuum operated motor operable to control operation of said element from its said first position to its said second position and adapted to be vented and thereby rendered inoperative to accommodate return of said element to its said first position; means urging said return of said element when said motor is vented; electrical means including vehicle speed responsive switch means adapted for operation in response to predetermined vehicle speed effecting venting of said motor, and further switch means operable for connection in series with the aforesaid switch means for effecting diminution in the normal power delivery of said engine and operable for restoring said normal power delivery in response to said return of said element.

31. In a motor vehicle provided with an internal combustion engine, an accelerator, an engine controlling ignition system and a change-speed transmission, power means for operating the transmission and in part controlling the operation of the ignition system to facilitate a certain operation of the transmission, said power means including a motor casing, a pressure differential and spring operated power element housed within said motor casing and operably connected to a drive-controlling element of the transmission, a control valve, a solenoid for operating said valve, an ignition controlling switch carried by said motor casing and adapted to open and close in response to movement of the power element, and electrical means cooperating with said switch to provide a means for cutting the ignition system into or out of operation and for controlling the operation of the solenoid, said electrical means including an accelerator operated switch, the parts of the power means being so constructed and arranged and so operative as to effect, after the accelerator is depressed sufficiently to close the switch operated thereby, a movement of the power element in one direction to move said drive-controlling element to thereby uncouple said element from another drive-controlling element of the transmission and at the same time render the electrical means, including the ignition controlling switch, operable to cut the ignition system out of operation and thereby facilitate said uncoupling operation.

32. In a motor vehicle provided with an internal combustion engine having an intake system, an accelerator, an engine controlling ignition system and a change-speed transmission, power means for operating the transmission and in part controlling the operation of the ignition system to facilitate a certain operation of the transmission, said power means including a motor casing, a pressure differential and spring operated power element housed within said motor casing and operably connected to a drive-controlling element of the transmission, a control valve for controlling application of differential pressure to the power element by utilizing the vacuum of said intake system, a solenoid for operating said valve, an ignition controlling switch carried by said motor casing, switch operating force transmitting means connected with the power element, and electrical means cooperating with said switch to provide a means for cutting the ignition system into or out of operation and for controlling the operation of the solenoid, said electrical means including an accelerator operated switch, the parts of the power means being so constructed and arranged and so operative as to effect, after the accelerator is depressed sufficiently to close the switch operated thereby, a movement of the power element in one direction to move said drive-controlling element to thereby uncouple said element from another drive-controlling element of the transmission and at the same time render the electrical means, including the ignition controlling switch, operable to cut the ignition system out of operation and thereby facilitate said uncoupling operation.

33. In a motor vehicle provided with an internal combustion engine having an intake system, an accelerator, an engine controlling ignition system and a change-speed transmission, power means for operating the transmission and in part controlling the operation of the ignition system to facilitate a certain operation of the transmission, said power means including a motor casing, a pressure differential and spring operated power element housed within said motor casing and operably connected to a drive-controlling element of the transmission, a control valve for controlling application of differential pressure to the power element by utilizing the vacuum of said intake system, a solenoid for operating said valve, an ignition controlling switch carried by said motor casing and adapted to open and close in response to movement of the power element, switch operating force transmitting means connected with the power element, and electrical means cooperating with said switch to provide a means for cutting the ignition system into or out of operation and for controlling the operation of the solenoid, said electrical means including an accelerator operated switch, the parts of the power means being so constructed and arranged and so operative as to effect, after the accelerator is depressed sufficiently to close the switch operated thereby, a movement of the power element in one direction to move said drive-controlling element to thereby uncouple said element from another drive-controlling element of the transmission, and at the same time render the electrical means, including the ignition controlling switch, operable to momentarily cut the ignition system out of operation and thereby facilitate said uncoupling operation.

34. In an automotive vehicle provided with an accelerator and a speed ratio changing transmission for varying the driving ratio between the engine and the driving wheels, power means for operating said transmission including a spring and vacuum operated motor comprising a casing and a power element, valve means for controlling the operation of said motor, a single electromagnet means operable both to actuate said valve means and, when energized, to maintain said power element in a certain position, and means for controlling the operation of said electromagnet means comprising a power operated relay switch and an accelerator operated switch.

35. In an automotive vehicle provided with a change speed transmission, power means for operating said transmission including a motor unit comprising a casing, a power element within said casing, a switch operating rod operably connected to said power element, a breaker switch actuated by said switch operating rod, a three-way valve mechanism for controlling the operation of the motor unit and electromagnetic means operable when energized, to so operate the valve mechanism as to effect an energization of the motor unit to move the power element to one of its operative positions, and furthermore to load said power element and thereby maintain it in said operative position.

36. In an automotive vehicle provided with a change speed transmission, power means for operating said transmission including as a single unit a multi-sectioned casing, a power element within one end of said casing, a connecting rod secured to said power element and projecting from one end of the casing, a switch operating rod housed within said casing and secured to said power element and connecting rod, a breaker switch housed within said casing and actuated by said switch operating rod, and a three-way valve mechanism housed within said casing and a solenoid mounted in the side of said casing and operable when energized, to so operate the valve mechanism as to effect an energization of the power means to move the power element to one of its operative positions and furthermore to load said power element and thereby maintain it in said operative position so long as the solenoid remains energized.

37. In an automotive vehicle provided with a change speed transmission, an ignition system, an accelerator and a vehicle speed responsive governor, power means for operating said transmission and in part controlling the operation of said ignition system, said power means including a motor comprising a casing and a power element, a power element operated switch housed within said motor unit and constituting a part of the means for controlling the ignition system, valve means for controlling the operation of said motor, power means operable both to actuate said valve means, and, when energized, to maintain said power element in a certain position, and means, rendered operative by the governor and accelerator, for controlling the operation of said last mentioned power means.

38. In an automotive vehicle provided with a change speed transmission, power means for operating said transmission including a motor unit comprising a casing, a power element within said casing, a connecting rod secured to said power element and projecting from one end of the casing, a switch operating rod housed within said casing and operated by said power element and a breaker switch housed within said casing and actuated by said switch operating rod, a three way valve mechanism for controlling the operation of the motor unit, and electromagnetic means operable, when energized, to so operate the valve mechanism as to effect an energization of the power means to move the power element to one of its operative positions and furthermore to load said power element and thereby maintain it in said operative position so long as the electromagnet remains energized.

39. In an automotive vehicle provided with a change speed transmission, power means for operating said transmission including a motor unit comprising a casing, a power element within said casing, a connecting rod secured to said power element and projecting from one end of the casing, a switch operating rod housed within said casing and secured to said power element and connecting rod and a breaker switch carried by said casing and actuated by said switch operating rod, a three-way valve mechanism for controlling the operation of the motor unit and electromagnetic means operable when energized, to so operate the valve mechanism as to effect an energization of the power means to move the power element to one of its operative positions and furthermore to load said power element and thereby maintain it in said operative position so long as the electromagnet remains energized.

40. In an automotive vehicle provided with a change speed transmission, power means for operating said transmission including a motor unit comprising a casing, a power element within said casing, a connecting rod secured to said power element and projecting from one end of the casing, a switch operating rod housed within said casing and secured to said power element and connecting rod, and a breaker switch housed within said casing and actuated by said switch operating rod, a three-way valve mechanism for controlling the operation of the motor unit and electromagnetic means operable when energized, to so operate the valve mechanism as to effect an energization of the power means to move the power element to one of its operative positions and furthermore to load said power element and thereby maintain it in said operative position so long as the electromagnet remains energized.

41. In a motor vehicle having an engine of the type provided with an ignition and a transmission including gearing adapted, when one member thereof is braked, to transmit a drive of one ratio and including means to automatically establish a drive of a different ratio upon release of said one gearing member for rotation, positively inter-engageable brake elements adapted when engaged to brake said one gearing member, means providing a drive connection between one of said brake elements and said one gearing member, means mounting the other of said brake elements against rotation thereof, said other brake element being subjected to torque load by said one brake element during operation of the first said drive, means yieldingly urging said other brake element toward its disengaged position, servo motor means for projecting said other brake element toward engaged position, electrically energizable means including a holding element operable upon energization of this means for acting upon said servo motor means for holding said other brake element in engaged position, means for deenergizing said electrically energizable means, and means for momentarily interrupting and then restoring the ignition of said engine simultaneously with the deenergization of said electrically energizable means, so as to temporarily remove the torque load on said other brake element and thereby facilitate disengagement thereof, said last means including a switch actuated in response to return of said servo motor means to brake releasing position.

42. In a power transmission for driving a motor vehicle having an internal combustion engine provided with an electrical ignition circuit and a driver manipulated throttle control, a driving shaft adapted to receive a drive from the engine and a driven shaft adapted to drive from said driving shaft, planetary gearing operable between said shafts for driving the driven shaft from said driving shaft, said gearing including a rotatable control gear adapted to be held from rotation to provide said drive through said gearing, positively interengaging members one of which is connected with said control gear and the other of which is mounted against rotation, said interengaging members being selectively operable into engaging position to hold said control gear to provide said drive through said gearing and into another position to accommodate establishment of a drive other than by said gearing, said elements when engaged being subjected to thrust transmission during said drive through said gearing so as to resist disengagement of said elements to release this drive until the torque delivery of the driving shaft is interrupted, a servo-motor for shifting said engageable members into engaging position, means responsive to the speed of the vehicle for controlling the energization and deenergization of said motor, and means controlled by said throttle control for momentarily interrupting the ignition system to momentarily interrupt the driving torque of said driving shaft and for deenergizing said motor independently of said speed responsive device.

43. In a motor vehicle transmission mechanism having planetary gearing including a sun gear, control mechanism for said sun gear comprising a shiftable member operable to hold or release said sun gear, differential pressure means for shifting said member, means for controlling said differential pressure means comprising an electric system including a solenoid and a pair of switches operable to open and close a circuit to the solenoid, accelerator operable mechanism for controlling one of the switches, and means responsive to vehicle speed for controlling the other switch.

44. In a motor vehicle transmission mechanism having planetary gearing including a sun gear, control mechanism for said sun gear comprising a shiftable member operable to hold or release said sun gear, differential pressure means for effecting shift of said member, means for controlling said differential pressure means including an electric system incorporating a solenoid and a pair of switches operable to open and close a circuit to the solenoid, accelerator operable mechanism for controlling one of the switches, and means responsive to vehicle speed for controlling the other switch.

45. In a power transmission for driving a motor vehicle, a driving shaft adapted to receive a drive from the engine and a driven shaft adapted to drive the vehicle, relatively slow speed driving means for driving the driven shaft from the driving shaft, relatively fast speed driving means for driving the driven shaft from the driving shaft at a speed greater than said slow speed driving means and including positively interengaging drive control elements operatively associated therewith and adapted when engaged to establish said fast speed drive, said relatively slow speed driving means including a control device operated automatically to establish this drive in response to release of said relatively fast speed drive means, fluid pressure operated means for biasing said interengaging elements into engaging position to establish a drive through said relatively fast speed driving means, and means responsive to the speed of the vehicle for rendering said fluid pressure operated means operative.

46. In a power transmission for motor vehicles, a driving shaft adapted to receive a drive from the engine and a driven shaft adapted to drive the vehicle, driving means for driving the driven shaft from said driving shaft at one speed, driving means for driving said driven shaft from said driving shaft at another speed, positively interengaging elements associated at least with one of said driving means and at least one of which elements is adapted to move into a position of engagement with the other of said elements to establish one of said drives and to move into a position of disengagement from said other element to enable the establishment of the other of said drives, pressure differential means for moving said one interengaging element into one position, means for moving said one interengaging element into the other position and speed responsive means for effecting the operation of one of said element moving means for moving the said one interengaging element into a position of engagement with the other of said interengaging elements.

47. In a power transmission for driving a vehicle having an engine of the type equipped with an ignition system; a transmission drive-controlling element operable from a first position to a second position for effecting a change in the transmission drive; a pressure differential operated motor operable to control operation of said element from its said first position to its said second position and adapted to be vented and thereby rendered inoperative whereby to accommodate return of said element to its first position; means urging said return of said element when said motor is vented; a control element adapted for operation from a first position to a second position thereof; means operating automatically in response to operation of said control element to its said second position for effecting venting of said motor and an interruption of said ignition system and means acting to restore said ignition system for normal operation as an incident to said return of said drive controlling element.

48. In a power transmission for an automotive vehicle having an engine of the type equipped with an ignition system; a driving shaft adapted to receive drive from the engine; a driven shaft adapted to drive the vehicle; means including positively interengageable drive control elements adapted, when interengaged, to establish a drive relationship between said shafts; differential pressure and spring operated motor means operated by differential fluid pressure to effect said interengagement of said control elements and by spring to effect relative disengagement of said control elements; and means for coincidentally controlling said motor means and said ignition system such that said disengagement of said control elements is effected by said spring operation accompanied by interruption in the normal operation of said ignition system, including a control switch automatically operating as an incident to said spring operation for restoring said ignition system to normal operation.

49. In a power transmission for an automotive vehicle, a driving shaft adapted to receive a drive from the engine, a driven shaft adapted to drive the vehicle, a relatively slow speed driving means for driving the vehicle from said driving shaft, a relatively fast speed driving means for driving said driven shaft at a speed greater than that of the slow speed driving means and including positively interengaging drive control elements adapted to establish, when engaged, said fast speed drive, said relatively slow speed driving means including a control device operating automatically to establish this drive in response to the release of said relatively fast speed driving means, means biasing said interengaging elements to disengaging relation to establish said relatively slow speed drive, motor means for moving and holding said interengaging elements into engaging relation for establishing said fast speed drive, and means responsive to the speed of the vehicle for energizing said motor means.

50. In a power transmission for driving a motor vehicle, a driving shaft adapted to receive a drive from the engine and a driven shaft adapted to drive the vehicle, relatively slow speed driving means for driving the driven shaft from the driving shaft, relatively fast speed driving means for driving the driven shaft from the driving shaft at a speed greater than said slow speed driving means and including positively interengaging drive control elements operatively associated therewith and adapted when engaged to establish said fast speed drive, said relatively slow speed driving means including a control device operating automatically to establish this drive in response to release of said relatively fast speed driving means, means biasing said interengaging elements into disengaging relation to establish said relatively slow speed drive, motor means for moving and holding said interengaging elements into engaging relation for establishing said fast speed drive, and means responsive to the speed of the vehicle for energizing said motor means and driver control means for deenergizing said motor means independently of said speed responsive means.

51. In a power transmission for driving a motor vehicle, a driving shaft adapted to receive a drive from the engine and a driven shaft adapted to drive the vehicle, relatively slow speed driving means for driving the driven shaft from the driving shaft, relatively fast speed driving means for driving the driven shaft from the driving shaft at a speed greater than said slow speed driving means and including positively interengaging drive control elements operatively associated therewith and adapted when engaged to establish said fast speed drive, said elements when engaged being subjected to thrust transmission during said relatively fast speed drive so as to resist disengagement of said elements to release this drive until torque delivery of the driving shaft is momentarily interrupted, said relatively slow speed driving means including a control device operating automatically to establish this drive in response to release of said relatively fast speed driving means, fluid pressure operated means for biasing said interengaging elements into engaging position to establish a drive through said relatively fast speed driving means, means responsive to the speed of the vehicle for rendering said fluid pressure operated means operative and driver controlled means for momentarily interrupting the torque delivery of said driving shaft and rendering said fluid pressure operated means inoperative independently of said speed responsive means for establishing said relatively slow speed drive.

52. In a power transmission for driving a motor vehicle having an internal combustion engine provided with an electrical ignition system and a driver manipulated throttle control, a driving shaft adapted to receive a drive from the engine, and a driven shaft adapted to drive the vehicle, relatively slow speed driving means for driving the driven shaft from the driving shaft, relatively fast speed driving means for driving the driven shaft from the driving shaft at a speed greater than said slow speed driving means and including positively interengaging drive control elements operatively associated therewith and adapted when engaged to establish said fast speed drive, said elements when engaged being subjected to thrust transmission during said relatively fast speed drive so as to resist disengagement of said elements to release the drive until the torque delivery of the driving shaft is interrupted, said relatively slow speed driving means including a control device operating automatically to establish this drive in response to release of said relatively fast speed driving means, fluid pressure operated means for biasing said interengaging elements into engaging position to establish a drive through said relatively fast speed driving means, means responsive to the speed of the vehicle for rendering said fluid pressure operated means operative, and means controlled by said throttle control for momentarily interrupting said engine ignition system to interrupt the torque delivery of said driving shaft and rendering said fluid pressure operated means inoperative to establish said relatively slow speed drive independently of said speed responsive means.

53. In a power tranmission for driving a motor vehicle having an internal combustion engine provided with an electrical ignition circuit and a driver manipulated throttle control, a driving shaft adapted to receive a drive from the engine and a driven shaft adapted to drive the vehicle, relatively slow speed driving means for driving the driven shaft from the driving shaft, relatively fast speed driving means for driving the driven shaft from the driving shaft at a speed greater than said slow speed driving means and including positively interengaging drive control elements operably associated therewith and adapted when engaged to establish said fast speed drive, said elements when engaged being subjected to a thrust transmission during said relatively fast speed drive so as to resist disengagement of said elements to release the drive until torque delivery of the driving shaft is momentarily interrupted, fluid pressure operated means for biasing said interengaging elements into engaging position to establish a drive through said relatively fast speed driving means, electromagnetic means responsive to the speed of the vehicle for controlling the admission of fluid pressure to said fluid pressure operated means, and means operated by said throttle control for deenergizing said electromagnetic means, and momentarily interrupting said ignition circuit to interrupt the torque drive of the driving shaft and establish said relatively slow speed drive.

54. In a motor vehicle drive having a rotatable driving structure adapted to receive drive from the engine and a rotatable driven structure adapted to transmit drive from the driving structure for driving the vehicle; relatively slow speed driving means, including an overrunning device operably associated therewith, for driving the driven structure from the driving structure; relatively fast speed driving means, including a shiftable drive-controlling member operably associated therewith, for driving the driven structure from the driving structure at a speed ratio faster than that provided by said slow driving means; said device automatically overrunning in response to coast of the driving structure to allow the driven structure to overrun the driving structure; means operably associated with said shiftable member for controlling shift thereof as a function of the relative speeds of said structures such that said shiftable member is prevented from shifting to establish operation of said fast driving means during operation of said slow driving means but is free to shift to establish operation of said fast driving means during said coast of the driving structure; means for shifting said shiftable member; a plurality of independently operable control means at least one of which is adapted for operation by the vehicle driver; and means responsive to operation of each of said plurality of control means for controlling said shifting means to effect release of said shiftable member thereby changing the drive from the fast driving means to the slow driving means.

55. In a motor vehicle having an internal combustion engine provided with ignition means, and a change speed transmission, a system for changing transmission speed ratio comprising power means, having a power element operably connected with the transmission, for so operating the transmission as to alternately effect a relatively high speed ratio between the engine and drive wheels of the vehicle and a relatively low speed ratio between the engine and drive wheels, said power means including a pressure differential and spring operated motor energized by a spring to effect a low speed ratio setting of the transmission and by a differential of fluid pressures within the motor to effect a high speed ratio setting of the transmission, means for interrupting the ignition means and means for coincidentally controlling the operation of said motor and said interrupting means including the accelerator of the vehicle, said system being so constructed and arranged as to effect said low speed ratio setting of the transmission with accompanying interruption of said ignition means, said low speed setting being effected after the accelerator is fully depressed.

56. In a power transmission for driving a motor vehicle, a driving shaft adapted to receive a drive from the engine and a driven shaft adapted to drive the vehicle, relatively slow speed driving means for driving the driven shaft from the driving shaft, relatively fast speed driving means for driving the driven shaft from said driving shaft and including positively interengaging elements associated with at least one of said driving means and adapted to move into disengaged position to establish said slow speed drive and to move into engaged position to establish said fast speed drive, fluid pressure means for moving said interengaging elements into one position, means for moving said interengaging elements into the other position, and speed responsive means for effecting the operation of one of said means for moving the interengaging elements into engaging position.

57. In a power transmission for driving a motor vehicle having an internal combustion engine and a driver manipulated throttle control; a driving shaft adapted to receive drive from the engine and a driven shaft adapted to drive from said driving shaft, means including planetary gearing operable between said shafts for driving the driven shaft from the driving shaft at the speed of the driving shaft or at an overspeed relatively thereto, said gearing including a rotatable control gear adapted to be held from rotation to provide said overspeed drive and to be released for rotation to release said overspeed drive and establish the slower drive; a non-rotatably mounted pawl selectively operable to a position for holding said control gear against rotation or to a position for releasing said control gear for rotation; a spring operably associated with said pawl; an electromagnet coil adapted to be electrically energized; means operating as a result of energizing operation of said coil for effecting operation of said pawl toward one of its said positions, said spring operating as a result of de-energizing operation of said coil for effecting operation of said pawl toward the other of its said positions; means conditioned upon the vehicle attaining a predetermined speed for effecting one of said operations of said coil; means for unloading thrust between said pawl and said control gear to facilitate operation of said pawl toward said releasing position; and means operating in response to driver manipulation of said throttle control in throttle opening direction for effecting the other of said operations of said coil and accompanying operation of said thrust unloading means.

58. In a power transmission for an automotive vehicle having an engine of the type equipped with an ignition system; a driving shaft adapted to receive drive from the engine; a driven shaft adapted to drive the vehicle; means including positively interengageable drive control elements adapted, when interengaged, to establish a drive relationship between said shafts; spring means biasing one of said interengaging control elements to disengaging relation with respect to the other to release said drive relationship; motor means having a power element operable upon energization of said motor means for moving said one control element into interengaging relation with the other for establishing said drive relationship; and means for controlling said motor means and coincidentally so controlling the ignition system as to effect momentary interruption of the ignition system thereby to facilitate movement of said one control element to said disengaging relation by said spring means, including a plurality of switch means for controlling the ignition system and means for effecting an operation of one of said switch means with the functioning of said motor means.

59. In a power transmission for driving a motor vehicle having an internal combustion engine and a driver operable engine throttle control, a driving shaft adapted to receive a drive from the engine and a driven shaft adapted to drive the vehicle, relatively slow speed driving means for driving the driven shaft from the driving shaft, relatively fast speed driving means for driving the driven shaft from the driving shaft at a speed greater than said slow speed driving means, and including positively interengaging drive control elements operatively associated therewith and adapted when engaged to establish said fast speed drive, said elements when engaged being subjected to thrust transmission during said relatively fast speed drive so as to resist disengagement of said elements to release the drive until the torque delivery of the driving shaft is momentarily interrupted, said relatively slow speed driving means including a control device operating automatically to establish this drive in response to release of said relatively fast speed driving means, fluid pressure operating means for biasing said interengaging elements into engaging position to establish a drive through said relatively fast speed driving means, means responsive to the speed of the vehicle to render said fluid pressure operated means operative, and means operated upon the operation of said engine throttle control for momentarily interrupting said driving shaft torque delivery and for rendering said fluid pressure operated means inoperative, to permit disengagement of said interengaging elements and the establishment of said relatively slow speed drive.

60. In a power transmission for driving a motor vehicle having a source of electrical power, a driving shaft adapted to receive a drive from the engine and a driven shaft adapted to drive the vehicle, relatively slow speed driving means for driving the driven shaft from the driving shaft, relatively fast speed driving means for driving the driven shaft from the driving shaft at a speed greater than said slow speed driving means and including positively interengaging drive control elements operably associated therewith and adapted when engaged to establish said fast speed drive, said elements when engaged being subjected to thrust transmission during said relatively fast speed drive so as to resist disengagement of said elements to release this drive until torque delivery of the driving shaft is momentarily interrupted, fluid pressure operated means for biasing said interengaging elements into engaging position to establish a drive through said relatively fast speed driving means, means responsive to the speed of the vehicle, means including electromagnetic means controlled by said speed responsive means and energizable by said power source for controlling the admission of fluid pressure to said fluid pressure operating means, and driver controlled means for de-energizing said electromagnetic means and for momentarily interrupting the torque delivery of the driving shaft to establish said relatively slow speed drive.

61. In a power transmission for driving a vehicle having an engine; a transmission drive-controlling element operable from a first position to a second position for effecting a change in the transmission drive; a motor operable to control operation of said element from its said first position to its said second position and adapted to be rendered inoperative, thereby to accommodate return of said element to its said first position; means urging said return of said element when said motor is rendered inoperative; vehicle driver controlled means operable to render said motor inoperative; and means operable as an incident to rendering said motor inoperative as aforesaid for momentarily interrupting the power delivery of the engine.

62. In a power transmission for driving a motor vehicle having an internal combustion engine and a driver operable engine throttle control; a driving shaft adapted to receive drive from the engine and a driven shaft adapted to drive the vehicle; relatively slow speed driving means for driving the driven shaft from the driving shaft; relatively fast speed driving means for driving the driven shaft from the driving shaft at a speed faster than that provided by said slow speed driving means, including positively engageable drive control elements operably associated therewith and adapted when engaged to establish said relatively fast speed drive, one of said drive control elements being movable relative to the other to establish and release said relatively fast speed drive, said elements when engaged being subjected to thrust transmission therebetween during said relatively fast speed drive so as to resist disengagement of said elements to release this drive until the power delivery of the engine is momentarily interrupted; said relatively slow speed driving means including a control device operating automatically to establish this drive in response to release of said relatively fast speed driving means; electromagnet controlled motor means adapted upon energization of said electromagnet to move said relatively movable drive control element for controlling operation of said relatively fast speed driving means; means yieldingly opposing movement of said relatively movable drive control element by said motor means; and means operating in response to driver operation of said throttle control for effecting such control of said electromagnet and for effecting momentary interruption of the power delivery of said engine whereby to cause said motor means to operate to step-down the drive through the transmission by effecting release of said relatively fast speed driving means and operation of said relatively slow speed driving means; a second change speed mechanism associated with said driving and driven shafts and means operatively associated with said second change speed mechanism for controlling energization of said electromagnet.

63. In a power transmission for driving a motor vehicle having an internal combustion engine and a driver manipulated throttle control; a driving shaft adapted to receive drive from the engine and a driven shaft adapted to drive the vehicle; means including planetary gearing operable between said shafts for driving the driven shaft from the driving shaft in a relatively slow speed drive or in a relatively fast speed drive, said relatively fast speed driving means including positively engageable drive control elements operably associated therewith adapted when engaged to establish said relatively fast speed drive, one of said drive control elements being movable relative to the other to establish said fast speed drive and being movable to release said fast speed drive, said drive control elements when engaged being subjected to thrust transmission therebetween during said relatively fast speed drive so as to resist disengagement of said elements to release this drive until the power delivery of the engine is interrupted; said relatively slow speed driving means including a control device operating automatically to establish this drive in response to release of said relatively fast speed drive; means for selectively controlling operation of said movable drive control element, said controlling means including a solenoid adapted upon energization thereof to so actuate this means as to effect one of said movements of said movable drive control element and upon de-energization thereof to effect the other of said movements of said movable drive control element; speed responsive means for controlling said element controlling means for effecting engagement of said drive control elements, and means operably associated with said solenoid and with said throttle control for effecting interruption of the power delivery of said engine and for so controlling said solenoid as to effect an operation of said movable control element to disengage the same for establishing said slow speed drive.

64. The invention as claimed in claim 63 including a multi-speed manually controlled transmission in tandem with said planetary gearing.

65. The invention as claimed in claim 64 wherein said manually controlled transmission includes means for controlling said solenoid.

66. In a power transmission for driving a motor vehicle having an engine and a driver manipulated throttle control, a driving shaft adapted to receive a drive from the engine and a driven shaft adapted to drive the vehicle, relatively slow speed driving means for driving the driven shaft from the driving shaft, relatively fast speed driving means for driving the driven shaft from the driving shaft at a speed greater than said slow speed driving means and including positively interengaging drive control elements operably associated therewith and adapted when engaged to establish said fast speed drive, said elements when engaged being subjected to thrust transmission during said relatively fast speed drive so as to resist disengagement of said elements to release this drive until torque delivery of the driving shaft is momentarily interrupted, differential fluid pressure operated motor means operable for biasing said interengaging elements into engaging position to establish a drive through said relatively fast speed driving means, electromagnetic means for controlling the operation of said motor means, speed responsive means for controlling the operation of said motor means and means under control of said driver throttle control for controlling said electromagnetic means and for momentarily interrupting the torque delivery of the driving shaft to facilitate establishment of said relatively slow speed drive.

67. The invention set forth in claim 66 wherein said slow speed drive means comprises planetary gearing.

68. In a power transmission for motor vehicles, a driving shaft adapted to receive a drive from the engine and a driven shaft adapted to drive the vehicle, driving means for driving the driven shaft from said driving shaft at one speed, driving means for driving said driven shaft from said driving shaft at another speed, positively interengaging elements associated with at least one of said driving means, at least one of which elements is adapted to move into a position of engagement with the other of said elements to establish one of said drives and to move into a position of disengagement from said other element to enable the establishment of the other of said drives, said elements when engaged being subjected to torque so as to resist disengagement of said elements to release the said one drive, pressure differential means for moving said one interengaging element into one position, means for moving said one interengaging element into the other position, speed responsive means for effecting the operation of one of said means for moving the said one interengaging element into a position of engagement with the other of said interengaging elements, and driver controlled means for controlling the other of said moving means and coincidentally so controlling the torque delivery of the engine as to effect momentary interruption thereof to enable the said other of the interengaging element moving means to move this element to effect disengagement of the elements.

69. In a power transmission for driving a motor vehicle having an internal combustion engine for delivering power thereto and a driver operable engine throttle control; a driving shaft adapted to receive drive from the engine and a driven shaft adapted to drive the vehicle; relatively slow speed driving means for driving the driven shaft from the driving shaft; relatively fast speed driving means for driving the driven shaft from the driving shaft at a speed faster than that provided by said slow speed driving means, including a positively engageable drive control element operably associated therewith and adapted when engaged to establish said relatively fast speed drive, said element when engaged being subject to driving thrust during said relatively fast speed drive so as to resist disengagement of said element to release this drive until the power delivery of the engine is momentarily interrupted; said relatively slow speed driving means including a control device operating automatically to establish this drive in response to release of said relatively fast speed driving means; electromagnet controlled means adapted upon energization of said electromagnet to effect engagement and upon deenergization thereof to effect disengagement of said element thereby to respectively establish and release said relatively fast speed driving means; and means operating in response to driver operation of said throttle control for controlling said electromagnet to effect deenergization of said means controlled thereby and for momentarily interrupting the power deliver of said engine thereby to step-down the drive through the transmission by effecting release of said relatively fast speed driving means and operation of said relatively slow speed driving means.

70. In a power transmission for driving a motor vehicle having an internal combustion engine for delivering power thereto and a driver operable engine throttle control; a driving shaft adapted to receive drive from the engine and a driven shaft adapted to drive the vehicle; relatively slow speed driving means for driving the driven shaft from the driving shaft; relatively fast speed driving means for driving the driven shaft from the driving shaft at a speed faster than that provided by said slow speed driving means, including a positively engageable drive control element operably associated therewith and adapted when engaged to establish said relatively fast speed drive, said element when engaged being subject to driving thrust during said relatively fast speed drive so as to resist disengagement of said element to release this drive until the power delivery of the engine is momentarily interrupted; said relatively slow speed driving means including a control device operating automatically to establish this drive in response to release of said relatively fast speed driving means; an electromagnet; means controlled by said electromagnet adapted upon energization of said electromagnet to effect engagement and upon deenergization thereof to effect disengagemnet of said element thereby to respectively establish and release said relatively fast speed driving means; and means operating in response to driver operation of said throttle control for controlling said electromagnet and for momentarily interrupting the power delivery of said engine thereby to step-down the drive through the transmission by effecting release of said relatively fast speed driving means and operation of said relatively slow speed driving means.

71. In a power transmission for driving a motor vehicle having an internal combustion engine and a driver manipulated throttle control; a driving shaft adapted to receive drive from the engine and a driven shaft adapted to drive from said driving shaft, means including planetary gearing operable between said shafts for driving the driven shaft from the driving shaft at the speed of the driving shaft or at a different speed relative thereto, said gearing including positively interengageable drive control elements adapted when engaged to establish one of said drives and upon disengagement to permit establishment of said different drive; and means for selectively controlling operation of said drive control elements, said controlling means including a solenoid adapted upon energization thereof to so actuate this means as to effect one operation of said drive control elements and upon deenergization thereof to effect the other of said operations of said drive control elements; speed responsive means for controlling the effectiveness of said controlling means for effecting engaging operation of said drive control elements, and means operably associated with said throttle control for controlling interruption of the power delivery of said engine and for controlling said solenoid upon manipulation of said throttle control whereby to effect disengaging operation of said drive control elements.

72. In a drive for a motor vehicle having an engine provided with an electrical ignition circuit; vehicle driver operable control means; transmission mechanism including positively engageable drive control elements adapted when engaged to establish a relatively fast speed ratio in said transmission and upon disengagement thereof to permit establishment of a relatively slow speed ratio in said transmission, fluid motor means, means responsive to vehicle speed for controlling said motor means, said motor means being operable for urging said elements into engagement; said elements during engagement thereof being subjected to thrust such that disengagement thereof is resisted; means for disengaging said elements; electrically controlled valve means for said motor means operable for effecting disengagement of said elements by said disengaging means thereby to release said fast speed ratio and including an electromagnet adapted to be controlled by said driver control means; said driver operable control means and electromagnet being operable to effect a momentary interruption of the ignition circuit to facilitate disengagement of said elements by said disengaging means.

73. In a power transmission for an automotive vehicle having an engine; a driving shaft adapted to receive drive from the engine; a driven shaft adapted to drive the vehicle; relatively slow speed driving means for driving the driven shaft from the driving shaft; relatively fast speed driving means including positively interengageable drive control elements adapted, when interengaged, to establish said fast speed drive relationship between said shafts; said slow speed driving means including a control device operable automatically to establish this drive in response to release of said fast speed driving means; spring means biasing one of said interengaging control elements to disengaging relation with respect to the other to release said fast speed drive relationship; motor means having a power element operable upon energization of said motor means for moving said one control element into interengaging relation with the other for establishing said fast speed drive relationship; and means for controlling energization of said motor means comprising electromagnetically operable means and speed responsive means.

74. In a power transmission for driving a vehicle having an engine; means operable to effect a change in the transmission speed ratio; electromagnet controlled motor means for controlling operation of said change speed means; speed controlled means for effecting energization and deenergization control of said electromagnet controlled motor means; a control element operable by the vehicle driver; and means operable in response to operation of said control element for controlling said electromagnet and momentary interruption of the normal power delivery of the engine.

75. In a power transmission for driving a vehicle having an engine; means operable to effect a change in the transmission speed ratio; electromagnet means controlled differential pressure fluid motor means for controlling operation of said change speed means; speed controlled means for controlling said electromagnet means controlled motor means; a control element operable by the vehicle driver; and means operable in response to operation of said control element for controlling energization of said electromagnet and momentary interruption of the normal power delivery of the engine.

76. In a power transmission for an automotive vehicle having an engine, a driving shaft adapted to receive a drive from the engine, a driven shaft adapted to drive the vehicle, a relatively slow speed driving means for driving said driven shaft from said driving shaft, a relatively fast speed driving means for driving said driven shaft at a speed greater than that of the slow speed driving means and including positively interengageable drive control elements adapted when engaged to establish said fast speed drive, one of said elements being movable in opposite directions for establishing and releasing such interengagement, said relatively slow speed driving means including a control device operating automatically to establish this drive in response to the release of said elements, a differential fluid pressure operable motor operable when energized to effect movement of said one element in one direction of said movement, yieldable means adapted when said motor is deenergized to move said one element in the other direction of said movement, valve means for controlling energization of said motor, and speed responsive means for controlling said valve means.

77. In a power transmission for driving a motor vehicle, a driving shaft adapted to receive a drive from the engine and a driven shaft adapted to drive the vehicle, driving means for driving the driven shaft from the driving shaft at one speed, driving means for driving the driven shaft from the driving shaft at a second speed, said second speed driving means including a control device operable automatically to establish this second speed drive in response to release of said first speed drive positively interengaging elements associated with said one speed driving means adapted to move into engaged position to establish said one speed drive and to move into disengaged position to release this one speed drive, fluid pressure means for moving said interengaging elements into one of said positions, separate means for moving said interengaging elements into the other of said positions, and speed responsive means for effecting operation of one of said moving means for moving said interengaging elements into engaged position.

References Cited in the file of this patent

UNITED STATES PATENTS

| | | |
|---|---|---|
| 1,839,145 | Forichon | Dec. 29, 1931 |
| 1,911,599 | Bloxsom | May 30, 1933 |
| 1,984,556 | Vetter | Dec. 18, 1934 |
| 2,045,500 | Thurber | June 23, 1936 |
| 2,104,608 | Cox et al. | Jan. 4, 1938 |
| 2,156,209 | Thurber | Apr. 25, 1939 |
| 2,214,099 | Claytor | Sept. 10, 1940 |
| 2,214,100 | Claytor | Sept. 10, 1940 |
| 2,222,913 | Pescara | Nov. 26, 1940 |
| 2,225,493 | Barnes | Dec. 17, 1940 |
| 2,242,519 | Frank | May 20, 1941 |
| 2,251,464 | Neracher | Aug. 5, 1941 |
| 2,254,334 | Vincent | Sept. 2, 1941 |
| 2,255,020 | Barnes | Sept. 2, 1941 |
| 2,257,838 | Claytor | Oct. 7, 1941 |
| 2,322,479 | Schjolin | June 22, 1943 |
| 2,333,668 | Neracher et al. | Nov. 9, 1943 |